US011133535B2

United States Patent
Kim et al.

(10) Patent No.: US 11,133,535 B2
(45) Date of Patent: Sep. 28, 2021

(54) METHOD FOR CONTROLLING A PLURALITY OF BATTERIES AND ELECTRONIC DEVICE THEREOF

(71) Applicant: Samsung Electronics Co., Ltd., Gyeonggi-do (KR)

(72) Inventors: Du-Hyun Kim, Gyeonggi-do (KR); Hyun-Seok Kim, Gyeonggi-do (KR); Yongseung Yi, Gyeonggi-do (KR); Hoyeong Lim, Gyeonggi-do (KR); Dong-Il Son, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 199 days.

(21) Appl. No.: 16/021,855

(22) Filed: Jun. 28, 2018

(65) Prior Publication Data

US 2019/0006722 A1    Jan. 3, 2019

(30) Foreign Application Priority Data

Jun. 28, 2017    (KR) .......................... 10-2017-0081980

(51) Int. Cl.
*H01M 10/42*    (2006.01)
*H01M 10/48*    (2006.01)
(Continued)

(52) U.S. Cl.
CPC ..... *H01M 10/4257* (2013.01); *H01M 10/425* (2013.01); *H01M 10/441* (2013.01);
(Continued)

(58) Field of Classification Search
CPC ........... H01M 10/4257; H01M 10/425; H01M 10/441; H01M 2/1077; H01M 2/30;
(Continued)

(56) References Cited

U.S. PATENT DOCUMENTS 6,074,775 A * 6/2000 Gartstein .............. H01M 50/30
429/53
6,850,039 B2 * 2/2005 Popescu .............. H01M 10/441
320/134

(Continued)

FOREIGN PATENT DOCUMENTS

| CN | 106300470 A | * | 1/2017 |
| EP | 3 168 956 | | 5/2017 |
| KR | 10-2015-0031094 | | 3/2015 |

OTHER PUBLICATIONS

European Search Report dated Nov. 7, 2018 issued in counterpart application No. 18180478.2-1202, 6 pages.

(Continued)

*Primary Examiner* — M Baye Diao
(74) *Attorney, Agent, or Firm* — The Farrell Law Firm, P.C.

(57) ABSTRACT

A method for controlling a plurality of batteries and an electronic device thereof are provided. The electronic device includes a power management circuit configured to supply power to the electronic device; a first battery electrically connected with a power input port of the power management circuit; a second battery electrically connected with the power input port; a first charging circuit configured to charge the first battery; a second charging circuit configured to charge the second battery; a first current control circuit electrically connected between the first charging circuit and the first battery, and configured to control a first charging current supplied from the first charging circuit to the first battery and a leakage current due to a voltage difference between the first battery and the second battery; and a second current control circuit electrically connected between the second charging circuit and the second battery, and configured to control a second charging current supplied (Continued)

from the second charging circuit to the second battery and the leakage current.

19 Claims, 15 Drawing Sheets

(51) Int. Cl.
| | |
|---|---|
| *H02J 7/00* | (2006.01) |
| *H01M 10/44* | (2006.01) |
| *H02J 7/34* | (2006.01) |
| *H01M 50/20* | (2021.01) |
| *H01M 50/543* | (2021.01) |
| *H01M 50/581* | (2021.01) |

(52) U.S. Cl.
CPC ......... *H01M 10/486* (2013.01); *H01M 50/20* (2021.01); *H01M 50/543* (2021.01); *H02J 7/0021* (2013.01); *H02J 7/0026* (2013.01); *H02J 7/0029* (2013.01); *H02J 7/0031* (2013.01); *H02J 7/00041* (2020.01); *H02J 7/00043* (2020.01); *H02J 7/342* (2020.01); *H01M 50/581* (2021.01); *H02J 7/0036* (2013.01); *H02J 7/00304* (2020.01); *H02J 7/007192* (2020.01); *H02J 2207/40* (2020.01)

(58) Field of Classification Search
CPC .. H01M 10/486; H01M 2/348; H02J 2207/40; H02J 7/342; H02J 7/00043; H02J 7/00041; H02J 7/0029; H02J 7/0031; H02J 7/007192; H02J 7/00304; H02J 7/0036
USPC ......................................................... 320/138
See application file for complete search history.

(56) References Cited

U.S. PATENT DOCUMENTS

| | | | | |
|---|---|---|---|---|
| 6,879,134 | B2* | 4/2005 | Stanesti | H02J 7/34 |
| | | | | 320/135 |
| 7,064,521 | B2* | 6/2006 | Stanesti | H02J 7/0025 |
| | | | | 320/126 |
| 7,911,263 | B2* | 3/2011 | Guo | H03K 17/0822 |
| | | | | 327/544 |
| 8,023,288 | B2* | 9/2011 | Engel | H02J 3/383 |
| | | | | 363/17 |
| 9,128,138 | B2* | 9/2015 | Nozawa | G01R 31/007 |
| 9,496,863 | B2* | 11/2016 | Jeon | H03K 17/6871 |
| 9,552,871 | B1* | 1/2017 | Shau | H01L 27/11582 |
| 9,608,298 | B2 | 3/2017 | Jeong et al. | |
| 9,621,161 | B1* | 4/2017 | Das | H03K 19/00323 |
| 9,660,638 | B1* | 5/2017 | Pwu | H03K 5/24 |
| 9,936,903 | B2* | 4/2018 | Gofman | A61B 5/14532 |
| 10,044,199 | B2* | 8/2018 | Matsumoto | H02J 7/0021 |
| 2008/0106234 | A1* | 5/2008 | Yun | H02J 7/0003 |
| | | | | 320/124 |
| 2015/0207346 | A1* | 7/2015 | Toivola | H02J 7/007182 |
| | | | | 320/107 |
| 2016/0043585 | A1* | 2/2016 | Zawadzki | H02J 7/0044 |
| | | | | 320/114 |
| 2017/0133862 | A1* | 5/2017 | Jung | H02J 7/007 |
| 2017/0294793 | A1* | 10/2017 | Yoon | H02J 7/045 |
| 2018/0145508 | A1* | 5/2018 | Chan | H02H 7/22 |

OTHER PUBLICATIONS

European Search Report dated Nov. 27, 2020 issued in counterpart application No. 18180478.2-1202, 5 pages.

* cited by examiner

METHOD FOR CONTROLLING A PLURALITY OF BATTERIES AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0081980, filed on Jun. 28, 2017, in the Korean Intellectual Property Office, the disclosure of which is incorporated by reference herein in its entirety.

BACKGROUND

1. Field

The present disclosure relates to a method and an electronic device for controlling a plurality of different batteries.

2. Description of the Related Art

Recently, with advances in digital technology, various electronic devices such as a mobile communication terminal, a personal digital assistant (PDA), an electronic note taking device, a smart phone, and a tablet personal computer (PC), capable of moving and processing communication and personal information are available. Such an electronic device uses a battery as its power supply means, for the sake of mobility. For a smooth supply of power to an electronic device, a plurality of batteries may be disposed in the electronic device.

If a plurality of batteries is disposed in an electronic device according to a limited battery capacity, the batteries may be used at the same time. To control the batteries which are charged or discharged together, charging circuits connected with each other may be disposed in the batteries. Since the charging circuits are connected, an electric current may flow between the batteries and a leakage current between the batteries may cause an overcharge or an overdischarge of the battery.

SUMMARY

An aspect of the present disclosure provides an apparatus and a method for controlling battery charging and discharging in an electronic device including a plurality of batteries.

According to an embodiment of the present disclosure, an electronic device is provided. The electronic device includes a power management circuit configured to supply power to the electronic device; a first battery electrically connected with a power input port of the power management circuit; a second battery electrically connected with the power input port; a first charging circuit configured to charge the first battery; a second charging circuit configured to charge the second battery; a first current control circuit electrically connected between the first charging circuit and the first battery, and configured to control a first charging current supplied from the first charging circuit to the first battery and a leakage current due to a voltage difference between the first battery and the second battery; and a second current control circuit electrically connected between the second charging circuit and the second battery, and configured to control a second charging current supplied from the second charging circuit to the second battery and the leakage current. According to an embodiment of the present disclosure, an electronic device is provided. The electronic device may include a power management circuit configured to supply power to the electronic device; a first battery electrically connected with a power input port of the power management circuit; a second battery electrically connected with the power input port; a first charging circuit configured to charge the first battery; a second charging circuit configured to charge the second battery; a first power supply control circuit electrically connected between the first charging circuit and the power management circuit, and configured to control a leakage current due to a voltage difference between the first battery and the second battery; and a second power supply control circuit electrically connected between the second charging circuit and the power management circuit and configured to control the leakage current.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
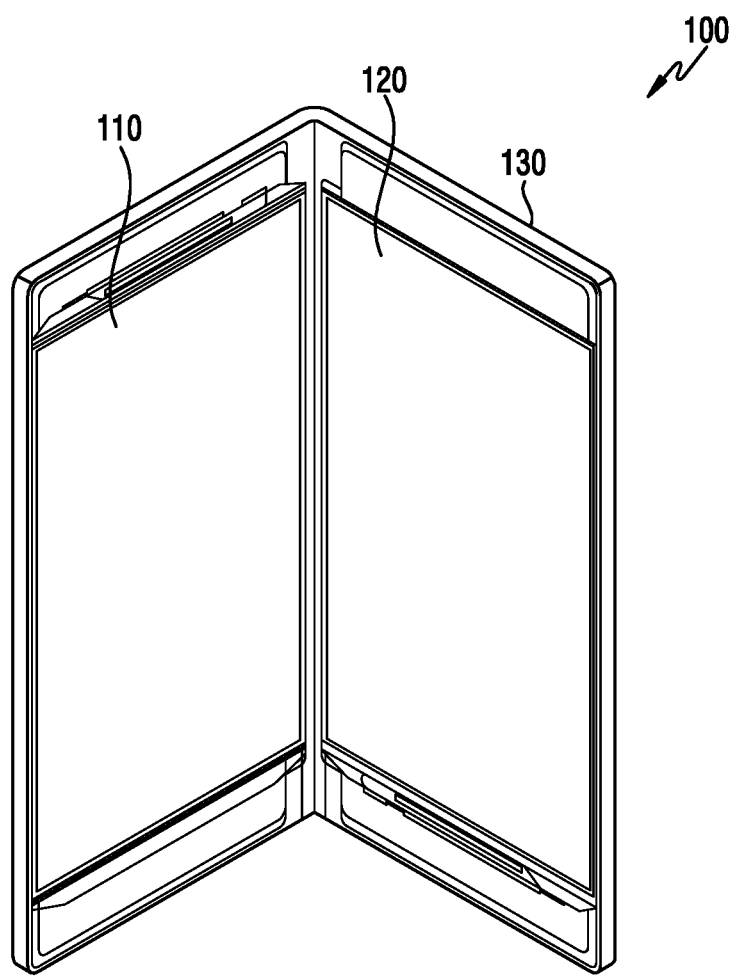
FIGS. 1A and 1B are illustrations of an electronic device according to various embodiments.

Hereinafter, embodiments of the present disclosure are described with reference to the accompanying drawings. It should be understood that there is no intention of limiting the present disclosure to the particular forms disclosed herein, and the present disclosure should be understood to cover various modifications, equivalents, and/or alternatives of embodiments of the present disclosure. In describing the accompanying drawings, similar reference numerals may be used to designate similar elements. Singular forms may include plural forms as well unless the context clearly indicates otherwise. In the present disclosure, the expressions "A or B", "at least one of A and/or B", "A, B, or C", and "at least one of A, B, or C" may include all possible combinations of the items listed. The expressions "a first", "a second", "the first", or "the second" as used in an embodiment of the present disclosure may modify various components regardless of the order and/or the importance but do not limit the corresponding components. It should be understood that when an element (e.g., a first element) is referred to as being (operatively or communicatively) "connected," or "coupled," to another element (e.g., a second element), the element may be directly connected or directly coupled to the other element or any other element (e.g., a third element) may be interposed therebetween.

The expression "configured to" as used in the present disclosure may be used interchangeably with, for example, the expressions "suitable for", "having the capacity to", "designed to", "adapted to", "made to", and "capable of" in hardware or in software according to the situation. In some situations, the expression "device configured to" may refer to a situation in which the device, together with other devices or components, "is able to". For example, the expression "processor adapted (or configured) to perform A, B, and C" may refer, for example, to a dedicated processor (e.g., an embedded processor) only for performing the corresponding operations or a general-purpose processor (e.g., a central processing unit (CPU) or an application processor (AP)) that may perform the corresponding operations by executing one or more software programs stored in a memory device.

An electronic device according to an embodiment of the present disclosure may include at least one of, for example, a smart phone, a tablet PC, a mobile phone, a video phone, an electronic book reader (e-book reader), a desktop PC, a laptop PC, a netbook computer, a workstation, a server, a PDA, a portable multimedia player (PMP), a moving picture experts group (MPEG-1) audio layer-3 (MP3) player, a mobile medical device, a camera, or a wearable device, but is not limited thereto. The wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad or tattoo), and an implantable circuit, but is not limited thereto. According to an embodiment, an electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync®, Apple TV®, or Google TV™), a game console (e.g., Xbox® and PlayStation®), an electronic dictionary, an electronic key, a camcorder, or an electronic photo frame, but is not limited thereto.

According to an embodiment, an electronic device may include at least one of various medical devices (e.g., various portable medical measuring devices (a blood glucose monitoring device, a heart rate monitoring device, a blood pressure measuring device, a thermometer, etc.), a magnetic resonance angiography (MRA) device, a magnetic resonance imaging (MRI) device, a computed tomography (CT) machine, or an ultrasonic machine)), a navigation device, a global navigation satellite system (GNSS), an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, a drone, an automated teller machine (ATM), a point of sales (POS) terminal, or an Internet of things (IoT) device (e.g., a light bulb, various sensors, a sprinkler device, a fire alarm, a thermostat, a streetlamp, a toaster, a sporting good, a hot water tank, a heater, a boiler, etc.), but is not limited thereto.

An electronic device may include at least one of a part of furniture, a building/structure or a vehicle, an electronic board, an electronic signature receiving device, a projector, and various kinds of measuring instruments (e.g., a water meter, an electric meter, a gas meter, and a radio wave meter), but is not limited thereto. An electronic device may be a flexible device or a combination of one or more of the aforementioned various devices. An electronic device is not limited to the aforementioned devices. As used herein, the term "user" may indicate a person who uses an electronic device or a device (e.g., an artificial intelligence electronic device) that uses an electronic device.

Figure 1B:
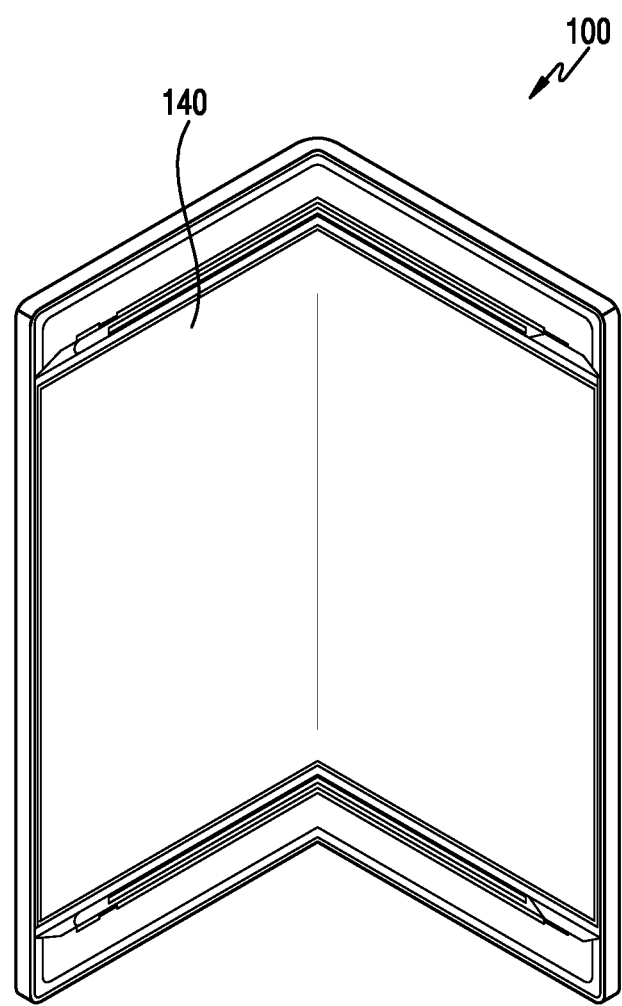
Figure 1C:
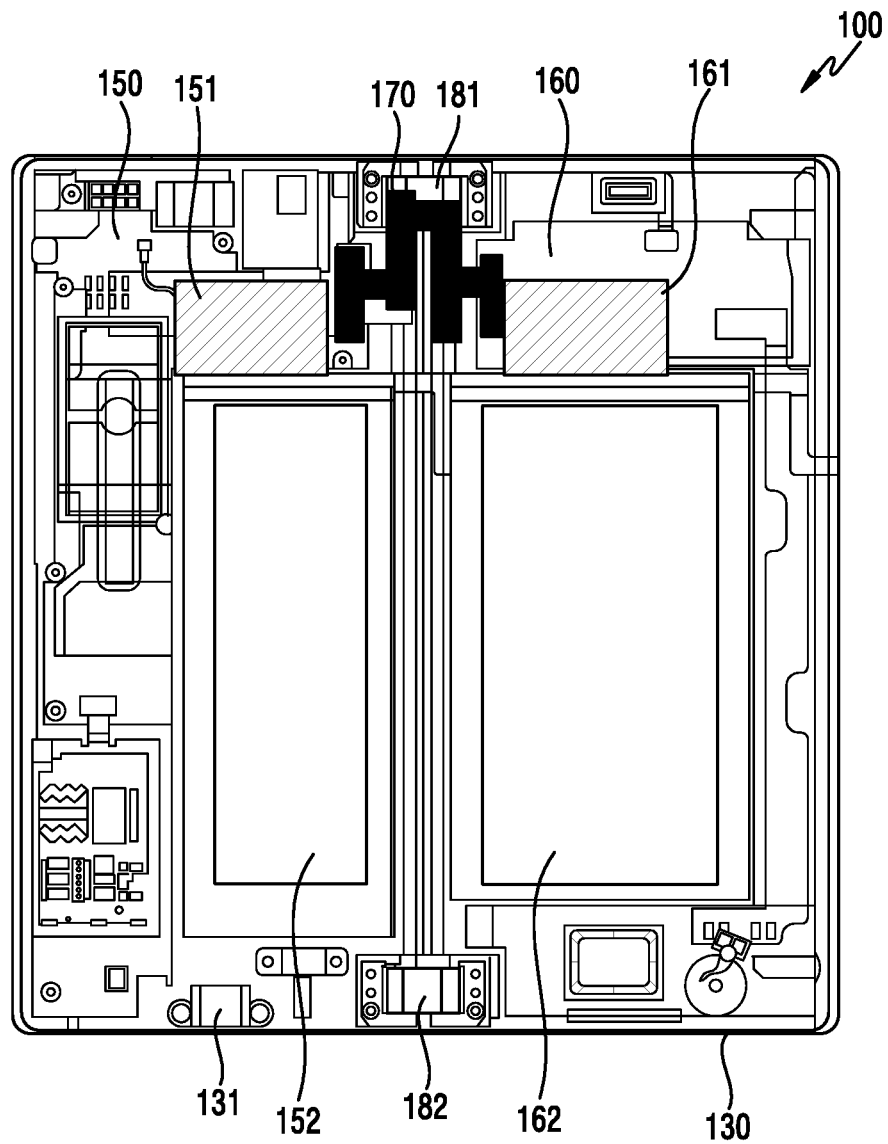
FIG. 1C is an illustration of an electronic device according to an embodiment.

FIGS. 1A and 1B are illustrations of an electronic device 100 according to an embodiment. FIG. 1C is an illustrations of the electronic device 100 according to an embodiment.

Referring to FIGS. 1A, 1B, and 1C, the electronic device 100 is disclosed in various embodiments. The electronic device 100 may include a housing 130 for accommodating internal electronic parts, a first touch screen 110, and a second touch screen 120. For example, the electronic device 100 may be folded like a foldable device or a wearable device, and the first touch screen 110 and the second touch screen 120 may be disposed on a right side and a left of a folding axis. The first touch screen 110 and the second touch screen 120 may display images and receive a touch input. The first touch screen 110 and the second touch screen 120 may include a display, a touch panel, a pen sensor (e.g., a digitizer), and so on.

According to an embodiment, the electronic device 100 may include an integrated touch screen 140 as shown in FIG. 1B. For example, the integrated touch screen 140 may display an image and receive a touch input. For example, the integrated touch screen 140 may be a flexible display. Hence, if the electronic device 100 is folded, the integrated touch screen 140 may also be bent.

The electronic device 100 according to an embodiment may include a housing 130, a first circuit board 150, a first charging circuit 151, a first battery 152, a second circuit board 160, a second charging circuit 161, a second battery 162, a connecting wiring 170, a first hinge 181, and a second hinge 182.

The housing 130 may provide a space for mounting internal electronic parts of the electronic device 100 and protect the internal electronic parts from the outside. For example, the housing 130 may be folded using the first hinge 181 and the second hinge 182.

The first circuit board 150 and the second circuit board 160 may include the first charging circuit 151 and the second charging circuit 161 respectively, and may further include a current control circuit and a power supply control circuit. For example, the first circuit board 150 and the second circuit board 160 may employ a printed circuit board (PCB).

The first charging circuit 151 and the second charging circuit 161 may provide at least some of the power supplied from one or more external power supply devices to the first battery 152 and the second battery 162, and supply at least some of the supplied power to a system. For example, the first charging circuit 151 and the second charging circuit 161 may be connected to the first battery 152 and the second battery 162, respectively. The first charging circuit 151 and the second charging circuit 161 may be connected to each other using the connecting wiring 170. Operations of the first charging circuit 151 and the second charging circuit 161 are described below.

The first battery 152 and the second battery 162 may be mounted in the housing 130 of the electronic device 100 and charged through the first charging circuit 151 and the second charging circuit 161. The first battery 152 and the second battery 162 may have difference capacities and impedances. The first battery 152 and the second battery 162 may include, for example, a rechargeable battery and/or a solar battery.

A connector 131 may be disposed, for example, in the housing 130. For example, the electronic device 100 may be connected to one or more external power supply devices. For example, the one or more external power supply devices may each be a wireless charging device or a wired charging device For example, the wired charging device may include a travel adaptor (TA) or an on-the-go (OTG) power supply device, and the wireless charging device may include a wireless power supply device or a wireless power transceiving device. According to an embodiment, the one or more external power supply devices may each be connected to the first charging circuit 151 and the second charging circuit 161.

Figure 2:
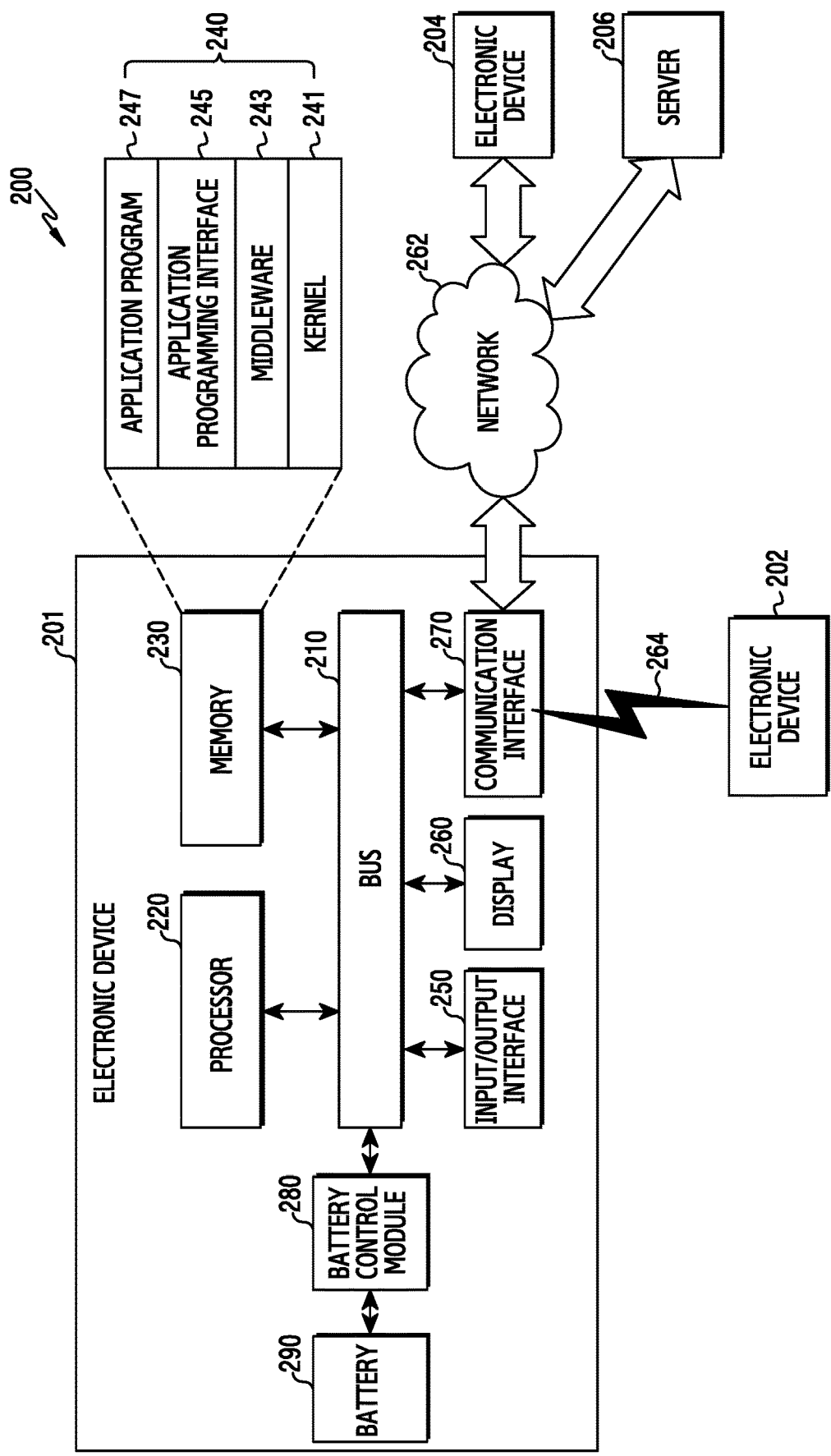
FIG. 2 is a block diagram of a network environment including an electronic device according to an embodiment.

FIG. 2 is a block diagram of a network environment 200 including an electronic device 201 according to an embodiment.

Referring to FIG. 2, the electronic device 201 is disposed in the network environment 200. The electronic device 201 may include a bus 210, a processor 220, a memory 230, an input/output interface 250, a display 260, a communication interface 270, a battery control module 280, and a battery 290. According to an embodiment, the electronic device 201 may omit at least one of the components, or may further include another component. The bus 210 may include a circuit which interconnects the components 210 through 280 and delivers communications (e.g., a control message and/or data) between the components 210 through 280. The processor 220 may include one or more of a CPU, an AP, a communication processor (CP), and a touch screen processor (TSP). The processor 220 may, for example, carry out calculation or data processing relating to control and/or communication of at least one other component of the electronic device 201.

The processor 220 may detect a connection of an external charging device. For example, the processor 220 may detect the connection of the external charging device and detect a charging current flowing into the battery control module 280.

The processor 220 may identify and compare power levels of the battery 290. For example, the battery 290 may include a plurality of batteries, and the processor 220 may determine which battery has a higher power level by comparing the power levels of the battery 290.

If one of the plurality of batteries in the battery 290 has the highest power level, the processor 220 may connect only the corresponding battery to the system and disconnect the other batteries from the system.

If an external power supply device is connected and the power supply to the system is required, the processor 220 may discharge the battery with the highest power level and charge the other batteries.

The processor 220 may identify a setting current of the battery control module 280. For example, the processor 220 may identify the setting currents corresponding to the plurality of batteries in the battery 290.

The processor 220 may determine whether battery state information satisfies an update condition. For example, the battery state information may include a battery power level, a battery temperature, a current of the battery, and so on. The update condition may include a case where a battery power level difference exceeds a threshold, or a case where the battery temperature exceeds a reference temperature.

If the battery state information satisfies the update condition, the processor 220 may change the setting current of the battery control module 280. For example, the processor 220 may increase the setting current of a battery with a high power level, and decrease the setting current of a battery with a low power level. For example, the processor 220 may decrease a setting current of a battery exceeding a reference temperature, and increase a setting current of a battery falling below the reference temperature.

The memory 230 may include a volatile memory and/or a non-volatile memory. The memory 230 may store, for example, commands or data relevant to at least one other component of the electronic device 201. According to an embodiment, the memory 230 may store software and/or a program 240.

The program 240 may include, for example, a kernel 241, middleware 243, an application programming interface (API) 245, and/or an application program (or application) 247. At least some of the kernel 241, the middleware 243, and the API 245 may be referred to as an operating system (OS). For example, the kernel 241 may control or manage system resources (e.g., the bus 210, the processor 220, or the memory 230) used for performing an operation or a function implemented in the other programs (e.g., the middleware 243, the API 245, or the application 247). Furthermore, the kernel 241 may provide an interface through which the middleware 243, the API 245, and the application 247 may access individual components of the electronic device 201 to control or manage the system resources.

The middleware 243, for example, may serve as an intermediary for allowing the API 245 or the application 247 to communicate with the kernel 241 to exchange data. The middleware 243 may process one or more task requests received from the application 247 according to priorities thereof. For example, the middleware 243 may assign priorities for using the system resources (e.g., the bus 210, the processor 220, or the memory 230) of the electronic device 201, to at least one of the application 247, and process the one or more task requests. The API 245 is an interface through which the application 247 controls functions provided from the kernel 241 or the middleware 243, and may include, for example, at least one interface or function (e.g., an instruction) for file control, window control, image processing, character control, and the like. The input/output interface 250, for example, may transfer commands or data input from a user or another external device to the other element(s) of the electronic device 201, or output the commands or data received from the other element(s) of the electronic device 201 to a user or another external device.

The display 260 may include a liquid crystal display (LCD), a light-emitting diode (LED) display, an organic light-emitting diode (OLED) display, a microelectromechanical Systems (MEMS) display, and an electronic paper display, but is not limited thereto. The display 260 may display, for example, various types of content (e.g., text, images, videos, icons, or symbols) to the user. The display 260 may include a touch screen, and may receive, for example, a touch input, a gesture input, a proximity input, or a hovering input using an electronic pen or a part of a user's body.

The communication interface 270 may establish communication, for example, between the electronic device 201 and an external device (e.g., a first external electronic device 202, a second external electronic device 204, or a server 206). For example, the communication interface 270 may access a network 262 through wireless or wired communication, and communicate with the second external electronic device 204 or the server 206.

The battery control module 280 may control the charging and the discharging of the battery 290. For example, the battery control module 280 may include a charging circuit, a current control circuit, a power supply control circuit, and the like.

The battery 290 may supply the power to the system through the battery control module 280. The battery 290 may include a plurality of batteries having different capacities and impedances. The battery 290 may include, for example, a rechargeable battery and/or a solar battery.

The wireless communication 264 may include cellular communication using at least one of, for example, long term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication 264 may include at least one of, for example, wireless fidelity (WiFi), light fidelity (LiFi), Bluetooth, Zigbee, near field communication (NFC), magnetic secure transmission (MST), radio frequency (RF), or body area network (BAN). The wireless communication 264 may include GNSS. The GNSS may include, for example, a global positioning system (GPS), a global navigation satellite system (Glonass), a Beidou navigation satellite system (Beidou) or the European global satellite-based navigation system (Galileo). Hereinafter, in the present disclosure, the term "GPS" may be used interchangeably with the term "GNSS". The wired communication may include, for example, at least one of a universal serial bus (USB), a high definition multimedia interface (HDMI), recommended standard 232 (RS-232), power line communication, or a plain old telephone service (POTS).

The network 262 may include a telecommunication network, for example, at least one of a computer network (e.g., a local area network (LAN) or a wide area network (WAN)), the Internet, or a telephone network.

The first and second external electronic devices 202 and 204 may each be the same as or different from the electronic device 201. According to an embodiment, all or some of the operations performed at the electronic device 201 may be executed in another one or a plurality of the electronic devices 202 and 204 or the server 206. If the electronic device 201 must perform some functions or services automatically or in response to a request, the electronic device 201 may request the electronic device 102, the electronic device 104, or the server 106 to execute at least some functions relating thereto instead of or in addition to autonomously performing the functions or services. The electronic device 102, the electronic device 104, or the server 106 may execute the requested functions or the additional functions, and may deliver a result of the execution to the electronic device 201. The electronic device 201 may process the received result as is or additionally processed, and may provide the requested functions or services. In this case, for example, cloud computing, distributed computing, or client-server computing technologies may be used.

Figure 3:
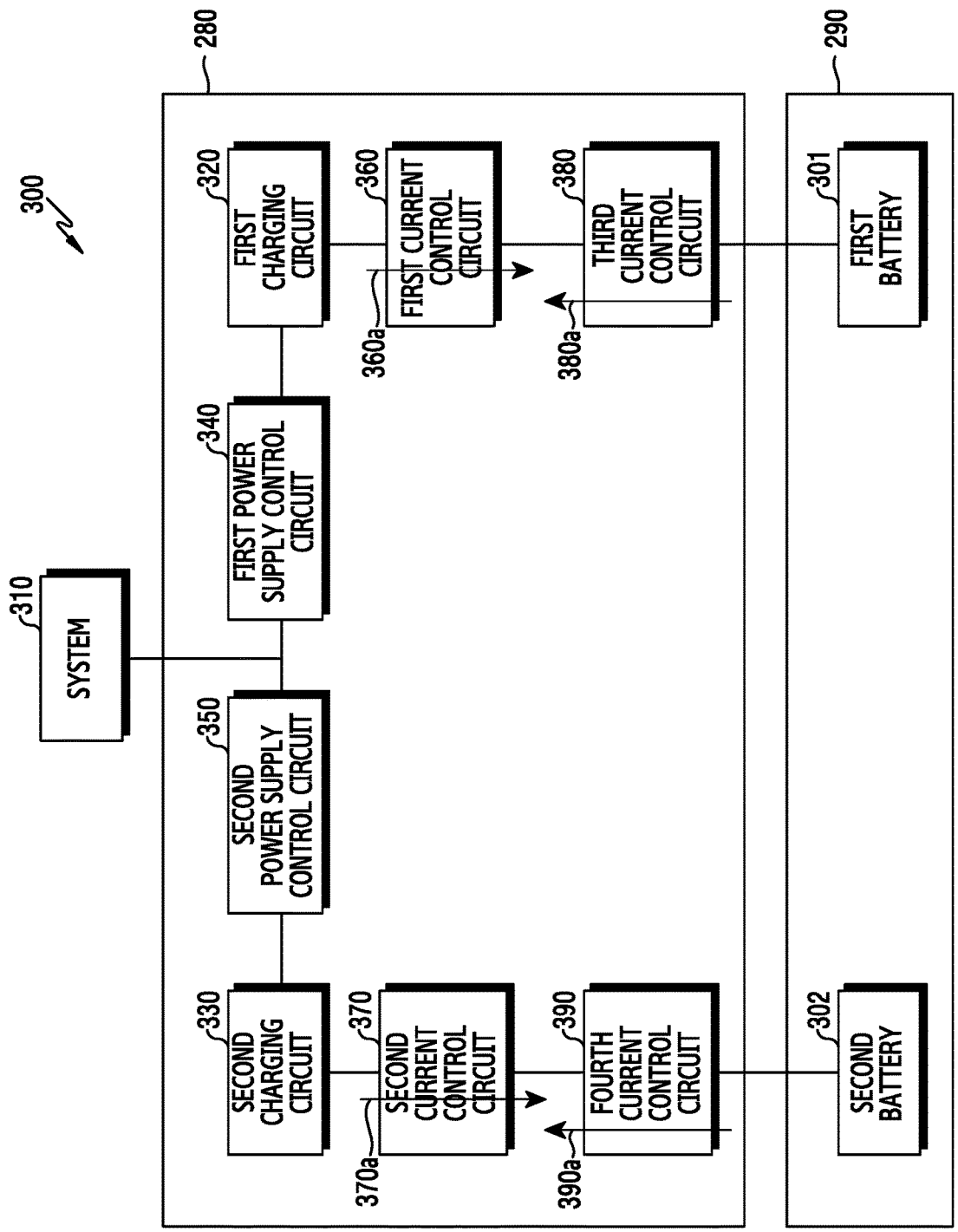
FIG. 3 is a block diagram of an electronic device for controlling a plurality of batteries according to an embodiment.

FIG. 3 is a block diagram of an electronic device 300 for controlling a plurality of batteries according to an embodiment. The battery control module 280 and the battery 290 of FIG. 2 are described below in greater detail. For example, two charging circuits and two batteries are disposed. The battery control module 280 may include a first charging circuit 320, a second charging circuit 330, a first power supply control circuit 340, a second power supply control circuit 350, a first current control circuit 360, a second current control circuit 370, a third current control circuit 380, and a fourth current control circuit 390. The battery 290 may include a first battery 301 and a second battery 302.

Referring to FIG. 3, the electronic device 300 (e.g., the electronic device 201 of FIG. 2) according to an embodiment may include a system 310, the first charging circuit 320, the second charging circuit 330, the first power supply control circuit 340, the second power supply control circuit 350, the first current control circuit 360, the second current control circuit 370, the third current control circuit 380, the fourth current control circuit 390, the first battery 301, and the second battery 302.

The system 310 may be, for example, at least one electronic part which operates with power in the electronic device 300, or a module which supplies power to at least one electronic part in the electronic device 300. For example, the system 310 may include the bus 210, the processor 220, the memory 230, the input/output interface 250, the display 260, and the communication interface 270 of FIG. 2.

The first charging circuit 320 may, for example, control charging of the first battery 301 and monitor capacity information (e.g., a battery power level) of the first battery 301. In an embodiment, the first charging circuit 320 may be connected to the system 310 through the first power supply control circuit 340, connected to the second charging circuit 330 through the first power supply control circuit 340 and the second power supply control circuit 350, and connected to the first battery 301 through the first current control circuit 360 and the third current control circuit 380.

The second charging circuit 330 may, for example, control charging of the second battery 302 and monitor capacity information (e.g., a battery power level) of the second battery 302. In an embodiment, the second charging circuit 330 may be connected to the system 310 through the second power supply control circuit 350, connected to the first charging circuit 320 through the first power supply control circuit 340 and the second power supply control circuit 350, and connected to the second battery 302 through the second current control circuit 370 and the fourth current control circuit 390.

According to an embodiment, the power supplied to the first charging circuit 320 or the second charging circuit 330 may be supplied only to the first battery 301 or the second battery 302, and some of the power may be supplied to the system 310.

The first power supply control circuit 340 may control, for example, whether to supply the power from the first battery 301 to the system 310. In an embodiment, the first power supply control circuit 340 may be electrically connected between the system 310 and the first charging circuit 320, and may control a leakage current due to a voltage difference between the first battery 301 and the second battery 302. For example, the first power supply control circuit 340 may include a switch. For example, the processor 220 may turn on the first power supply control circuit 340 and thus supply the power from the first battery 301 to the system 310. In addition, by turning off the first power supply control circuit 340, the processor 220 may cut off the power supplied from the first battery 301 and block the leakage current which flows from the second battery 302 to the first battery 301.

The second power supply control circuit 350 may control, for example, whether to supply the power from the second battery 302 to the system 310. In an embodiment, the second power supply control circuit 350 may be electrically connected between the system 310 and the second charging circuit 330, and may control a leakage current due to a voltage difference between the first battery 301 and the second battery 302. For example, the second power supply control circuit 350 may include a switch. For example, the processor 220 may turn on the second power supply control circuit 350 and thus supply the power from the second battery 302 to the system 310. In addition, by turning off the second power supply control circuit 350, the processor 220 may cut off the power supplied from the second battery 302 and block the leakage current which flows from the first battery 301 to the second battery 302.

The first current control circuit 360 may, for example, control a charging current to be below an allowable current of the first battery 301. In an embodiment, the first current control circuit 360 may be electrically connected between the first charging circuit 320 and the first battery 301, control a first charging current 360a flowing from the first charging circuit 320 to the first battery 301, and control a leakage current due to a voltage difference between the first battery 301 and the second battery 302. For example, if a first current that is greater than the allowable current of the first battery 301 flows through the first battery 301, the first current control circuit 360 may lower the first current to below the allowable current. In this case, the first current may be at least one of the first charging current 360a and the leakage current. For example, the processor 220 may control a setting current of the first current control circuit 360. For example, the processor 220 may change the setting current of the first current control circuit 360, based on a state of the system 310, power levels of the first battery 301 and the second battery 302, and temperatures of the first battery 301 and the second battery 302.

The second current control circuit 370 may, for example, control a charging current to be below an allowable current of the second battery 302. In an embodiment, the second current control circuit 370 may be electrically connected between the second charging circuit 330 and the second battery 302, control a second charging current 370a flowing from the second charging circuit 330 to the second battery 302, and control a leakage current due to a voltage difference between the first battery 301 and the second battery 302. For example, if a second current that is greater than the allowable current of the second battery 302 flows through the second battery 302, the second current control circuit 370 may lower the second current to be below the allowable current. In this case, the second current may be at least one of the second charging current 370a and the leakage current. For example, the processor 220 may control a setting current of the second current control circuit 370. For example, the processor 220 may change the setting current of the second current control circuit 370, based on the state of the system 310, the power levels of the first battery 301 and the second battery 302, and the temperatures of the first battery 301 and the second battery 302.

The third current control circuit 380 may, for example, control a discharging current to be below the allowable current of the first battery 301. In an embodiment, the third current control circuit 380 may be electrically connected between the first charging circuit 320 and the first battery 301, control a first discharging current 380a flowing from the first battery 301 to the first charging circuit 320, and control a leakage current due to a voltage difference between the first battery 301 and the second battery 302. For example, if a third current that is greater than the allowable current of the first battery 301 flows through the first battery 301, the third current control circuit 380 may decrease the third current to be below the allowable current. In this case, the third current may be at least one of the first discharging current 380a and the leakage current. For example, the processor 220 may control a setting current of the third current control circuit 380. For example, the processor 220 may change the setting current of the third current control circuit 380, based on the state of the system 310, the power levels of the first battery 301 and the second battery 302, and the temperatures of the first battery 301 and the second battery 302.

The fourth current control circuit 390 may, for example, control a discharging current to be below the allowable current of the second battery 302. In an embodiment, the fourth current control circuit 390 may be electrically connected between the second charging circuit 330 and the second battery 302, control a second discharging current 390a flowing from the second battery 302 to the second charging circuit 330, and control a leakage current due to a voltage difference between the first battery 301 and the second battery 302. For example, if a fourth current that is greater than the allowable current of the second battery 302 flows through the second battery 302, the fourth current control circuit 390 may decrease the fourth current to be below the allowable current. In this case, the fourth current may be at least one of the second discharging current 390a and the leakage current. For example, the processor 220 may control a setting current of the fourth current control circuit 390. For example, the processor 220 may change the setting current of the fourth current control circuit 390, based on the state of the system 310, the power levels of the first battery 301 and the second battery 302, and the temperatures of the first battery 301 and the second battery 302.

The first battery 301 and the second battery 302 may supply power to the system 310 and have different characteristics (e.g., capacity and impedance). The first battery 301 and the second battery 302 may include a rechargeable battery and/or a solar battery.

According to an embodiment, an output port of the first current control circuit 360 and an output port of the third current control circuit 380 may be connected, and an output port of the second current control circuit 370 and an output port of the fourth current control circuit 390 may be connected, which is described below in greater detail with reference to FIG. 6.

The first current control circuit 360 and the third current control circuit 380 may be configured as a single circuit, and the second current control circuit 370 and the fourth current control circuit 390 may be configured as a single circuit.

The first current control circuit 360 through the fourth current control circuit 390 of the electronic device 300 may be omitted.

Figure 4A:
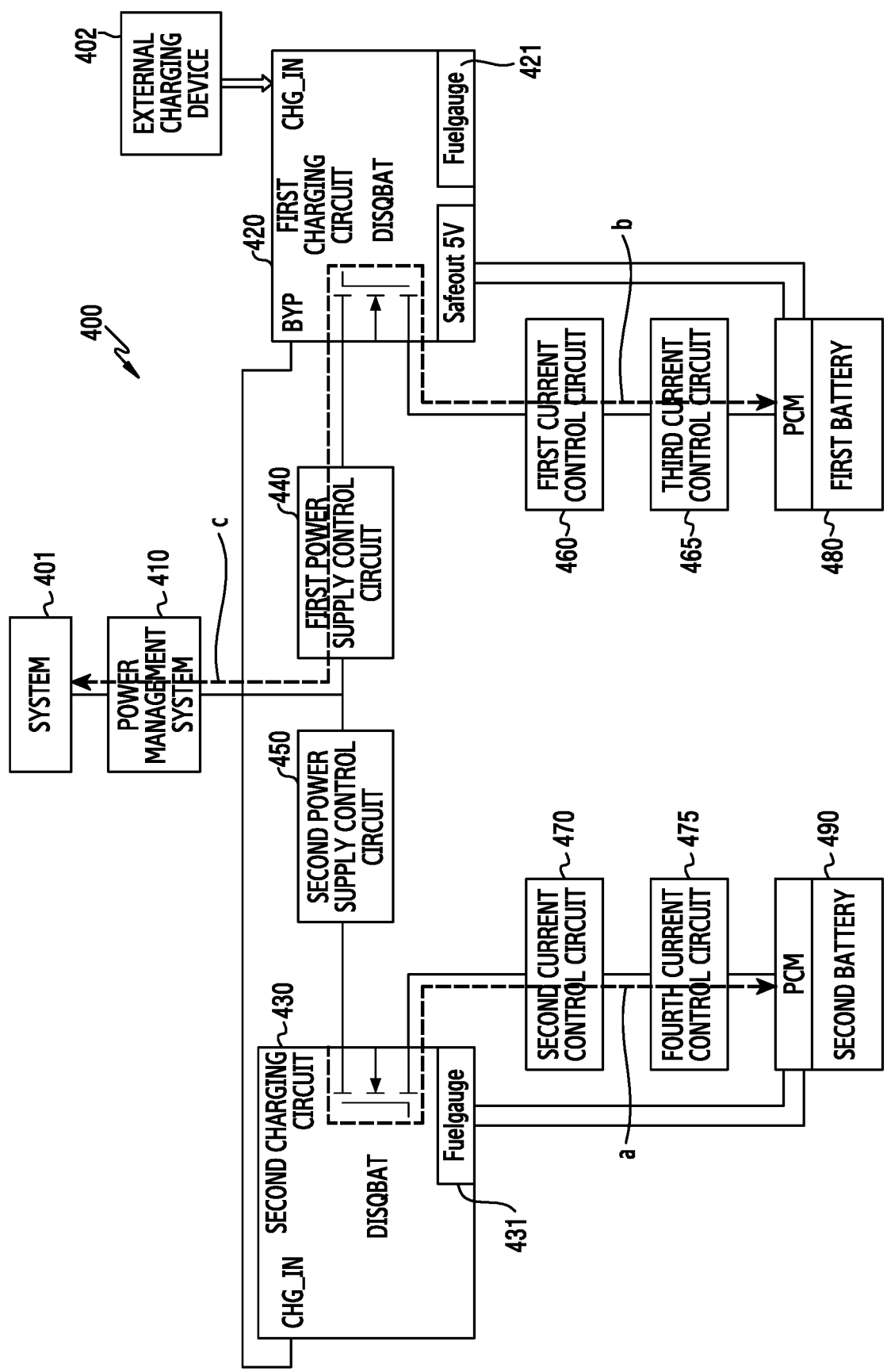
FIG. 4A is a block diagram of an electronic device for charging and discharging a plurality of batteries according to an embodiment.

FIG. 4A is a block diagram of an electronic device 400 for charging and discharging a plurality of batteries according to an embodiment. In FIG. 4A, a first power supply control circuit 440, a second power supply control circuit 450, and a first current control circuit 460, a second current control circuit 470, a third current control circuit 465, and a fourth current control circuit 475 may be controlled by the processor 220 of FIG. 2. In FIG. 4A, an external charging device 402 is connected to the electronic device 400.

Referring to FIG. 4A, the electronic device 400 may further include a power management system 410. In an embodiment, the power management system 410 may provide power from batteries to components of a system 401, and include a power management integrated circuit (PMIC). For example, an input port of the power management system 410 may be connected to a first battery 480 through the first power supply control circuit 440, a first charging circuit 420, the first current control circuit 460, and the third current control circuit 465, and connected to a second battery 490 through the second power supply control circuit 450, a second charging circuit 430, the second current control circuit 470, and the fourth current control circuit 475.

In an embodiment, the first charging circuit 420 and the second charging circuit 430 may monitor the power level of the first battery 480 and the second battery 490 using their internal power or fuel gauges 421 and 431, respectively. For example, the processor 220 may continually update the power level of the first battery 480 and the second battery 490 through the first charging circuit 420 and the second charging circuit 430.

The processor 220 may detect a connection of the external charging device 402. The external charging device 402 may be a wireless charging device or a wired charging device. For example, the wired charging device may include a TA or OTG power supply device, and the wireless charging device may include a wireless power supply device or a wireless power transceiving device.

If the external charging device 402 is connected to the input port CHG_IN of the first charging circuit 420, the processor 220 may control the first power supply control circuit 440 and the second power supply control circuit 450, based on the power levels of the first battery 480 and the second battery 490. For example, the processor 220 may identify the power levels of the first battery 480 and the second battery 490, and determine which one of the first battery 480 and the second battery 490 has a greater power level. If the first battery 480 has a greater power level than the second battery 490, the processor 220 may turn on the first power supply control circuit 440 and turn off the second power supply control circuit 450. In contrast, if the second battery 490 has a greater power level than the first battery 480, the processor 220 may turn off the first power supply control circuit 440 and turn on the second power supply control circuit 450.

If the first power supply control circuit 440 is turned on and the second power supply control circuit 450 is turned off, the second battery 490 may only perform discharging and the first battery 480 may perform either charging or discharging. For example, the first charging circuit 420 may supply a first charging current b to the first battery 480 with power from the external electronic device 402, and the second charging circuit 430 may supply a second charging current a to the second battery 490 with power supplied through the input port CHG_IN.

If the external electronic device 402 is connected and the system 401 requires the power supply, the processor 220 may control to discharge the first battery 480. That is, if the first power supply control circuit 440 is turned on and the second power supply control circuit 450 is turned off, the first battery 480 may be connected to the system 401 and the processor 220 may stop charging the first battery 480 and supply a first discharging current c of the first battery 480 to the system 401. In this case, the first discharging current c from the first battery 480 may only be supplied to the system 401 and block the leakage current to the second battery 490. That is, if the second power supply control circuit 450 is turned on, the first discharging current c from the first battery 480 may be leaked to the second battery 470 via the second charging circuit 430 due to a voltage difference between the first battery 480 and the second battery 490, which may overcharge and damage the second battery 490. However, the present disclosure may prevent the first discharging current c from leaking to the second battery 490 by turning off the second power supply control circuit 450. Thus, even if discharging of the first battery 480 and charging of the second battery 490 are performed at the same time, battery overcharge may be prevented.

According to an embodiment, the electronic device 400 may include a plurality of batteries. If the electronic device 400 includes a plurality of batteries, the electronic device 400 may include a charging circuit for each of the plurality of batteries, where the charging circuits may be interconnected, and a power supply control circuit may be disposed between the system 401 and a charging circuit. If one of the plurality of batteries stops charging and supplies a discharging current to the system 401, the discharging current may flow into another charging circuit rather than the system 401, because the charging circuits are interconnected. A leakage current to another charging circuit may cause an overcharge of a battery which is charging. For example, if a first discharging current c of the first battery 480 of FIG. 4A is supplied to the second charging circuit 430, the second battery 490 may be overcharged. Thus, to block the battery discharging current from flowing into another battery which is charging, the electronic device 400 which is charging through an external electronic device 402 may turn on only the power supply control circuit connected with the battery with the greater power level and turn off all the power supply control circuits connected with the other batteries. That is, with multiple batteries, the electronic device 400 may limit the number of batteries supplying power during battery charging to one. In this case, it is possible to prevent a discharging current of one of the batteries from leaking to another battery while the batteries are charging.

The first current control circuit 460 may prevent the current of the first battery 480 from exceeding an allowable current of the first battery 480. For example, if a current over an allowable current flows in the first battery 480 due to various reasons such as malfunction of the first power supply control circuit 440 or the first charging circuit 420, the first current control circuit 460 may lower the current below the allowable current. In the same manner as the first current control circuit 460, the second charging circuit 470 may prevent the current of the second battery 490 from exceeding an allowable current of the second battery 490.

To charge the first battery 480 or the second battery 490, the processor 220 may control the setting currents of the first current control circuit 460 and the second current control circuit 470, based on the power levels and the temperature of the first battery 480 and the second battery 490. For example, if the power level of the first battery 480 is greater than the power level of the second battery 490, the processor 220 may lower the setting current of the first current control circuit 460 and increase the setting current of the second current control circuit 470. Thus, more charging current may be supplied to the second battery 490 than the first battery 480 with the greater power level. For example, if the temperature of the first battery 480 exceeds a reference temperature, the processor 220 may lower the setting current of the first current control circuit 460 and increase the setting current of the second current control circuit 470. Hence, the charging current to the first battery 480 with the greater temperature may be limited, and more charging current may be supplied to the second battery 490.

The first battery 480 and the second battery 490 may each include a separate overcharge/overcurrent protect circuit module (PCM).

Figure 4B:
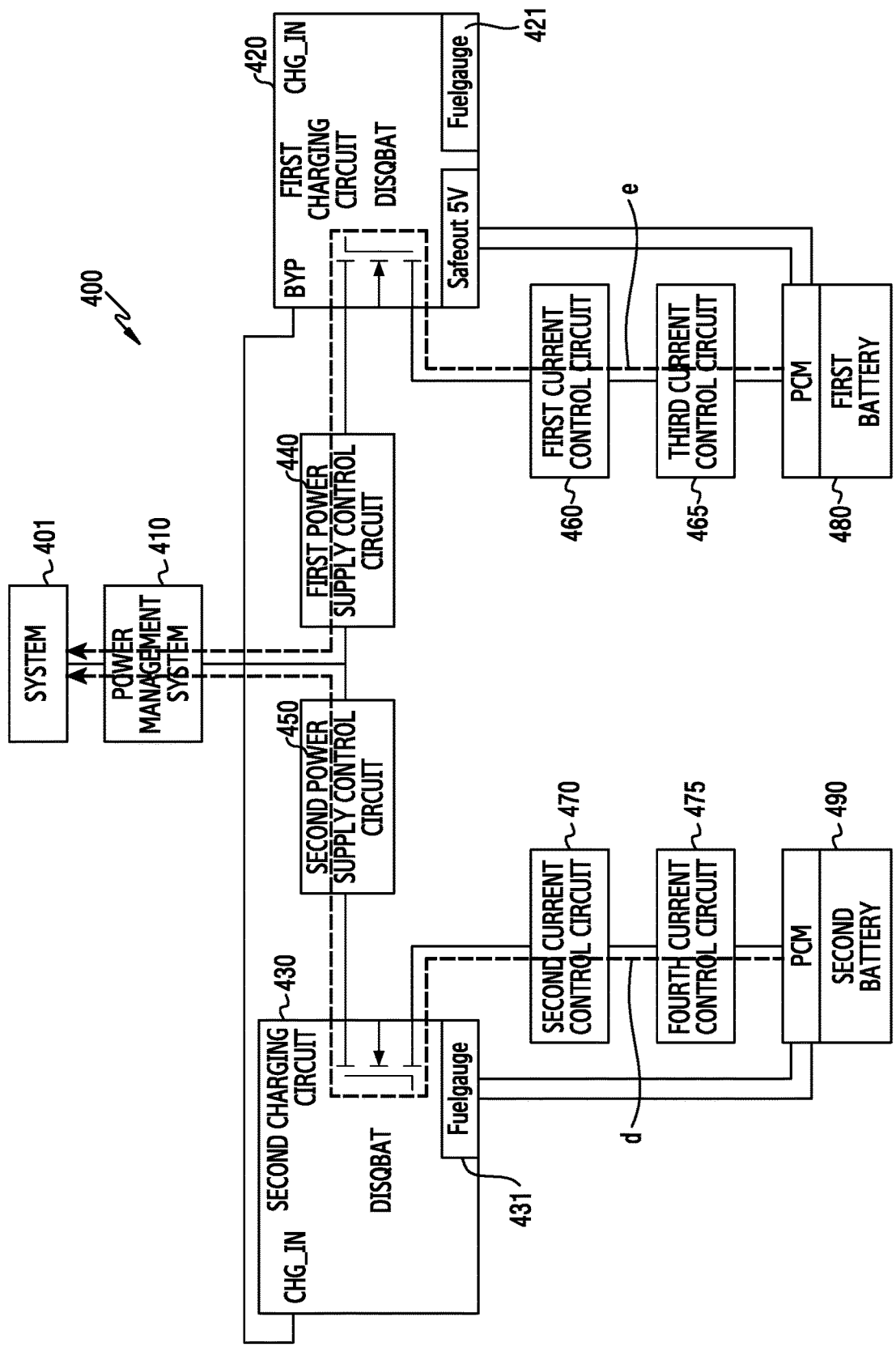
FIG. 4B is a block diagram of an electronic device for discharging a plurality of batteries according to an embodiment.

FIG. 4B is a block diagram of the electronic device 400 for discharging a plurality of batteries according to an embodiment. The first power supply control circuit 440, the second power supply control circuit 450, and the first current control circuit 460, the second current control circuit 470, the third current control circuit 465, and the fourth current control circuit 475 may be controlled by the processor 220 of FIG. 2. In FIG. 4B, the plurality of the batteries supply power to the system 401 at the same time.

Referring to FIG. 4B, the first battery 480 and the second battery 490 may supply power to the system 401 at the same time. Either the first battery 480 or the second battery 490 may supply power to the system 401.

In an embodiment, if power is supplied to the system 401, the processor 220 may monitor the currents flowing in the third current control circuit 465 and the fourth current control circuit 475, and change the setting current if a current greater than the setting current flows in the third current control circuit 465 or the fourth current control circuit 475. For example, the processor 220 may control the third current control circuit 465 to flow a first discharging current e that is less than the allowable current of the first battery 480, and control the fourth current control circuit 475 to flow a second discharging current d that is less than the allowable current of the second battery 490.

The processor 220 may supply power to the system 401 by controlling the third current control circuit 465 and the fourth current control circuit 475, based on the state of the system 401, the power levels of the first battery 480 and the second battery 490, and the temperatures of the first battery 480 and the second battery 490. For example, the processor 220 may identify the power levels of the first battery 480 and the second battery 490 through the first charging circuit 420 and the second charging circuit 430, and compare the power levels of the first battery 480 and the second battery 490. If the power level of the first battery 480 is greater than the power level of the second battery 490, the processor 220 may increase the setting current of the third current control circuit 465 and decrease the setting current of the fourth current control circuit 475. Hence, the first battery 480 may supply more first discharging current e to the system 401, and the second battery 490 may supply less second discharging current d to the system 401. For example, the processor 220 may identify the temperatures of the first battery 480 and the second battery 490 through the first charging circuit 420 and the second charging circuit 430. If the temperature of the first battery 480 is greater than the reference temperature, the processor 220 may decrease the setting current of the third current control circuit 465 and increase the setting current of the fourth current control circuit 475. Herein, the reference temperature may be the allowable temperature of the battery. Thus, the first discharging current e of the first battery 480 may be limited or reduced, and the second discharging current d of the second battery 490 may be increased.

In this case, even if the first battery 480 and the second battery 490 have different power levels, the third current control circuit 465 and the fourth current control circuit 475 may control the discharging current to exceed the allowable current all the time, which is shown in Table 1 below. As shown in Table 1 below, by means of the third current control circuit 465 and the fourth current control circuit 475, the current over the allowable current may not flow in the battery with the greater power level.

TABLE 1

| | | current flowing in the battery for which power level is full (100%) | | |
|---|---|---|---|---|
| power level of a first battery | power level of a second battery | not applying a current control circuit | applying a current control circuit | an allowable current |
| 0% | 100% | 2.22 A | 1.08 A | 1.85 A |
| 100% | 0% | 2.2 A | 1.7 A | 1.85 A |

Figure 5:
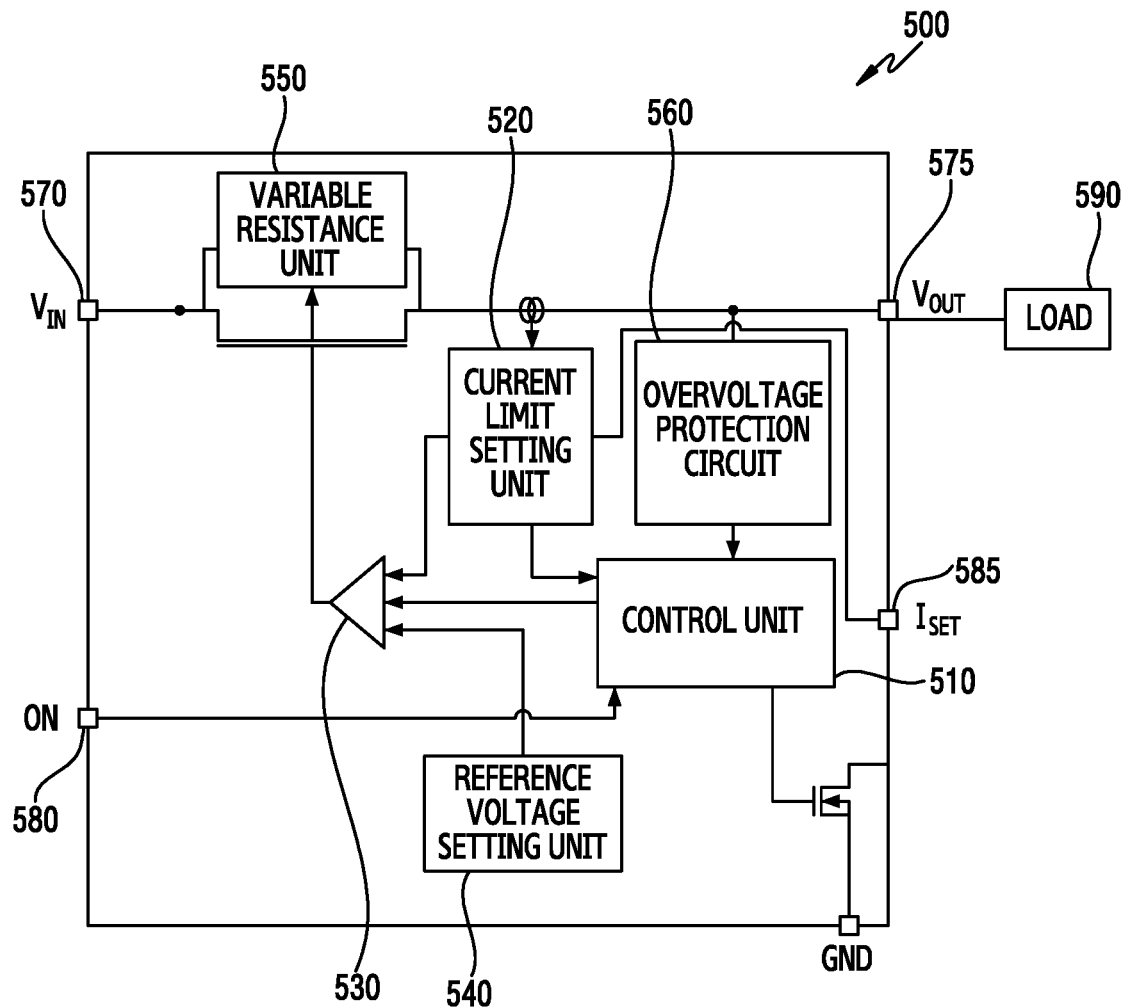
FIG. 5 is a block diagram of a current control circuit according to an embodiment.

FIG. 5 is a block diagram of a current control circuit 500 according to an embodiment. The current control circuit 500 may be identical to the first current control circuit through the fourth current control circuit of FIGS. 3, 4A, and 4B.

Referring to FIG. 5, the current control circuit 500 (e.g., the first current control circuit 360 or 460, the second current control circuit 370 or 470, the third current control circuit 380 or 480, or the fourth current control circuit 390 or 490 of FIG. 3, 4A, or 4B, respectively) may include a control unit 510, a current limit setting unit 520 (e.g., a current limit unit), a comparing unit 530, a reference voltage setting unit 540 (e.g., a charge pump), a variable resistance unit 550 (e.g., a true reverse-current blocking (TRCB) device), an overvoltage protection circuit 560 (e.g., an over voltage protection (OVP) device), a voltage input port 570 (e.g., Vin), a voltage output port 575 (e.g., a Vout), a current path setting input port 580 (e.g., ON), and a setting current input port 585 (e.g., Iset). The current control circuit 500 may supply a current to a load 590. Herein, the load 590 may be the system 310 of FIG. 3.

The control unit 510 may, for example, control operations of the current control circuit 500 and control a current to be below a setting current. For example, in response to the current being below the setting current, the control unit 510 may control the current by minimizing a resistance of the variable resistance unit 550. In contrast, in response to the current being over the setting current, the control unit 510 may control the current to be below the setting current by increasing the resistance of the variable resistance unit 550. For example, if the setting current is 0.5 A, an input voltage is 5V, and the resistance of the load 590 is 5Ω, the control unit 510 may set the resistance of the variable resistance unit 550 to 5Ω and thus control a current of 0.5 A to flow from the voltage input port 570 to the voltage output port 575.

The control unit 510 may, for example, receive an ON/OFF setting signal of a current path from the current path setting input port 580 through the processor 220. For example, in response to the current path OFF signal received from the processor 220, the control unit 510 may stop the current by setting the resistance of the variable resistance unit 550 to infinity.

The current limit setting unit 520 may, for example, store the setting current value received from the setting current input port 585, and detect the current between the setting current input port 585 and the voltage output port 575. For example, the current limit setting unit 520 may send the setting current value and the detected current to the comparing unit 530.

The comparing unit 530 may, for example, compare the setting current value and the detected current, which are received from the current limit setting unit 520, provide a comparison result to the control unit 510, and provide an output voltage to a gate voltage of the variable resistance unit 550 under control of the control unit 510.

By controlling the output voltage of the comparing unit 530, the control unit 510 may, for example, adjust the resistance of the variable resistance unit 550 and control the current flowing between the voltage input port 570 and the voltage output port 575.

The overvoltage protecting circuit 560 may, for example, identify the current being over an allowable current of the current control circuit 500, and block the current path in response to the current being over the allowable current.

Figure 6:
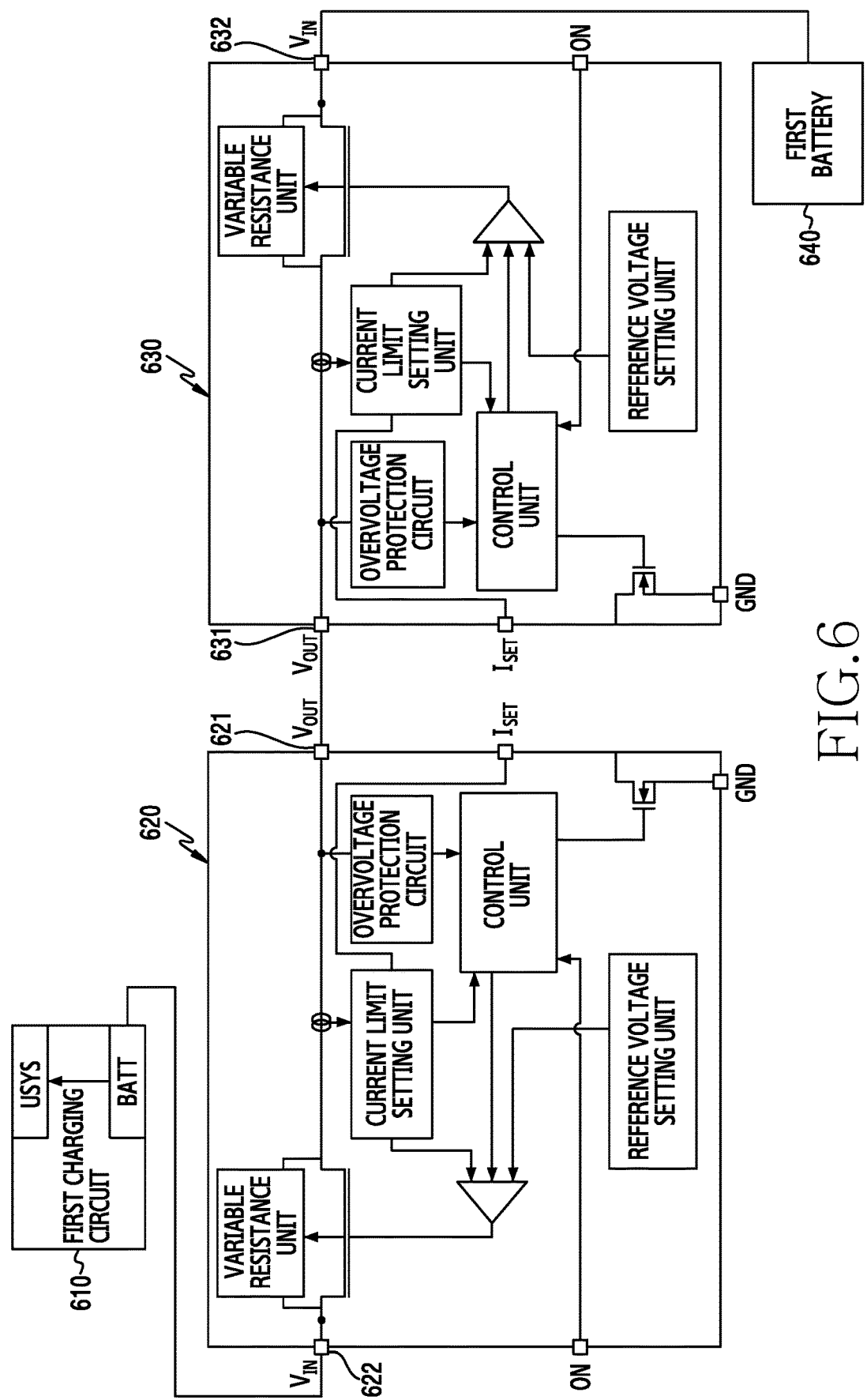
FIG. 6 is a block diagram of current control circuits according to an embodiment.

FIG. 6 is a block diagram of current control circuits according to an embodiment. Descriptions of a second charging circuit, a second current control circuit, a fourth current control circuit, and a second battery, which are connected in the same fashion as a first charging circuit, a first current control circuit, a third current control circuit, and a first battery, are omitted below.

Referring to FIG. 6, a first charging circuit 610 (e.g., the first charging circuit 320 of FIG. 3 or the first charging circuit 420 of FIGS. 4A and 4B), a first current control circuit 620 (e.g., the first current control circuit 360 of FIG. 3 or the first current control circuit 460 of FIGS. 4A and 4B), a third current control circuit 630 (e.g., the third current control circuit 380 of FIG. 3 or the third current control circuit 465 of FIGS. 4A and 4B), and a first battery 640 (e.g., the first battery 301 of FIG. 3 or the first battery 480 of FIGS. 4A and 4B) may be connected in order. For example, the first current control circuit 620 may control a charging current flowing from the first charging circuit 610 to the first battery 640. To do so, a voltage output port (e.g., Vout) 621 may be connected to the third current control circuit 630 and the first battery 640, and a voltage input port (e.g., Vin) 622 may be connected to the first charging circuit 610. The third current control circuit 630 may control a discharging current flowing from the first battery 640 to the first charging circuit 610. To do so, a voltage output port (e.g., Vout) 631 may be connected to the first current control circuit 620 and the first charging circuit 610, and a voltage input port (e.g., Vin) 632 may be connected to the first battery 640. The voltage output port 621 of the first current control circuit 620 may be connected with the voltage output port 631 of the third current control circuit 630.

According to an embodiment, the first current control circuit 620 and the third current control circuit 630 may be configured as a single current control circuit, and the single current control circuit may control the charging and the discharging of the first battery 640.

Figure 7:
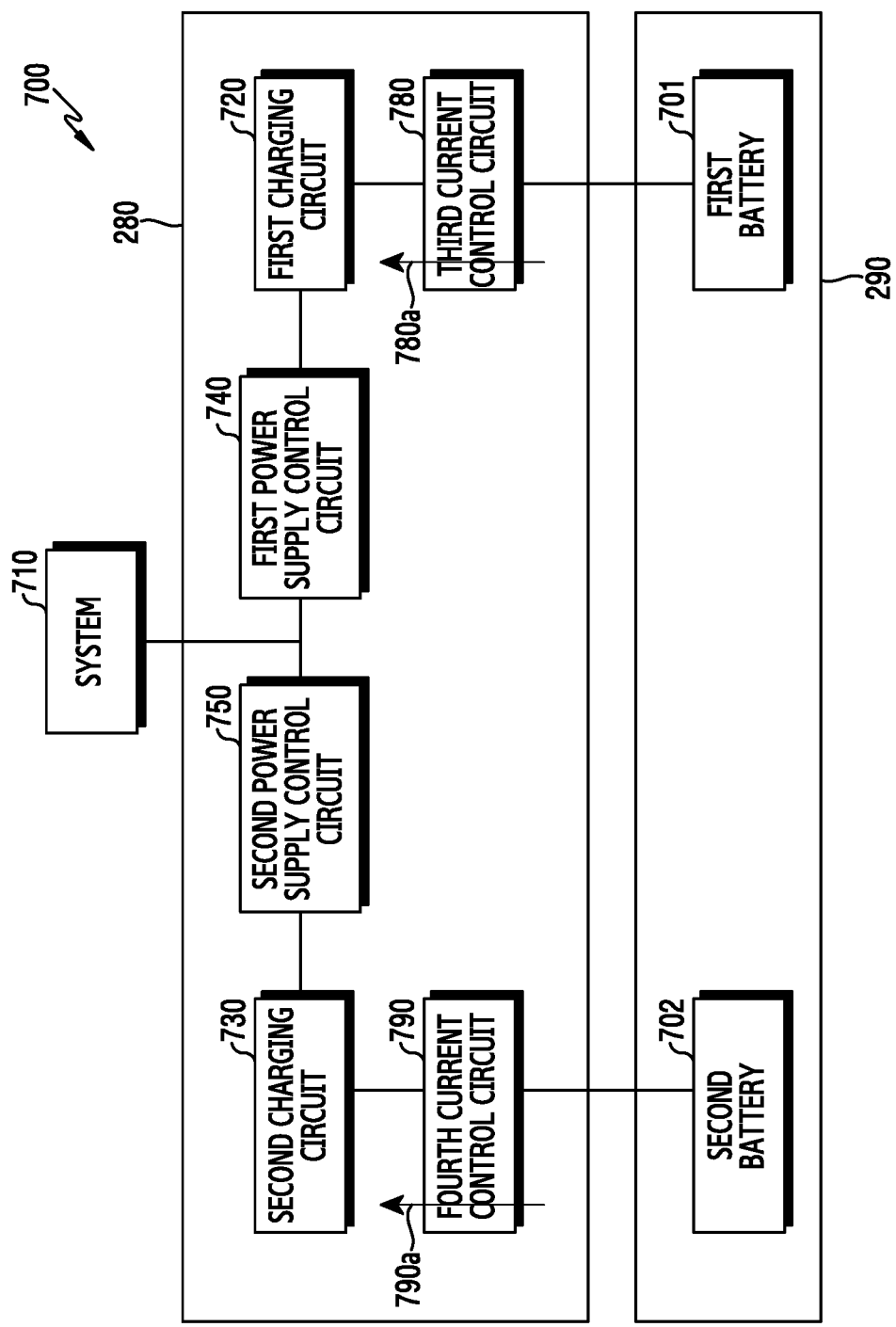
FIG. 7 is a block diagram of an electronic device for controlling a plurality of batteries according to an embodiment.

FIG. 7 is a block diagram of an electronic device 700 for controlling a plurality of batteries according to an embodiment. The battery control module 280 and the battery 290 of FIG. 2 are described below. To facilitate understanding, a repeated description of FIG. 3 is omitted below. A first power supply control circuit 740, a second power supply control circuit 750, a third current control circuit 780, and a fourth current control circuit 790 may be controlled by the processor 220 of FIG. 2.

Referring to FIG. 7, the electronic device 700 may include a system 710, a first charging circuit 720, a second charging circuit 730, the first power supply control circuit 740, the second power supply control circuit 750, the third current control circuit 780, the fourth current control circuit 790, a first battery 701, and a second battery 702.

If not separately supplying power to the system 710 during charging, the electronic device 700 may control to charge the first battery 701 and the second battery 702 using the first power supply control circuit 740, the second power supply control circuit 750, the first charging circuit 720, and the second charging circuit 730. For example, if the electronic device 700 is turned off, the electronic device 700 may turn off the first power supply control circuit 740 or the second power supply control circuit 750 during charging using an external charging device, and thus prevent a leakage current between the first battery 701 and the second battery 702.

To supply the power to the system 710, the electronic device 700 may prevent a leakage current between the first battery 701 and the second battery 702 by turning off the first power supply control circuit 740 or the second power supply control circuit 750 during charging using an external charging device, and control a first discharging current 780a or a second discharging current 790a to not exceed an allowable current of the first battery 701 and the second battery 702 using the third current control circuit 780 or the fourth current control circuit 790, respectively. For example, if the first power supply control circuit 740 is turned off, the fourth current control circuit 790 may control the second discharging current 790a supplied from the second battery 702 to the system 710. In contrast, if the second power supply control circuit 750 is turned off, the third current control circuit 780 may control the first discharging current 780a supplied from the first battery 701 to the system 710.

If an external charging device is disconnected and the electronic device 700 is not charging, both of the first power supply control circuit 740 and the second power supply control circuit 750 may be turned on and the electronic device 700 may control the first discharging current 780a and the second discharging current 790a to not exceed an allowable current of the first battery 701 and the second battery 702 using the third current control circuit 780 and the fourth current control circuit 790, respectively. The components of FIG. 7 may perform the same operations as the components of FIG. 3.

According to an embodiment, the third current control circuit 780 and the fourth current control circuit 790 may be omitted in the electronic device 700.

Figure 8:
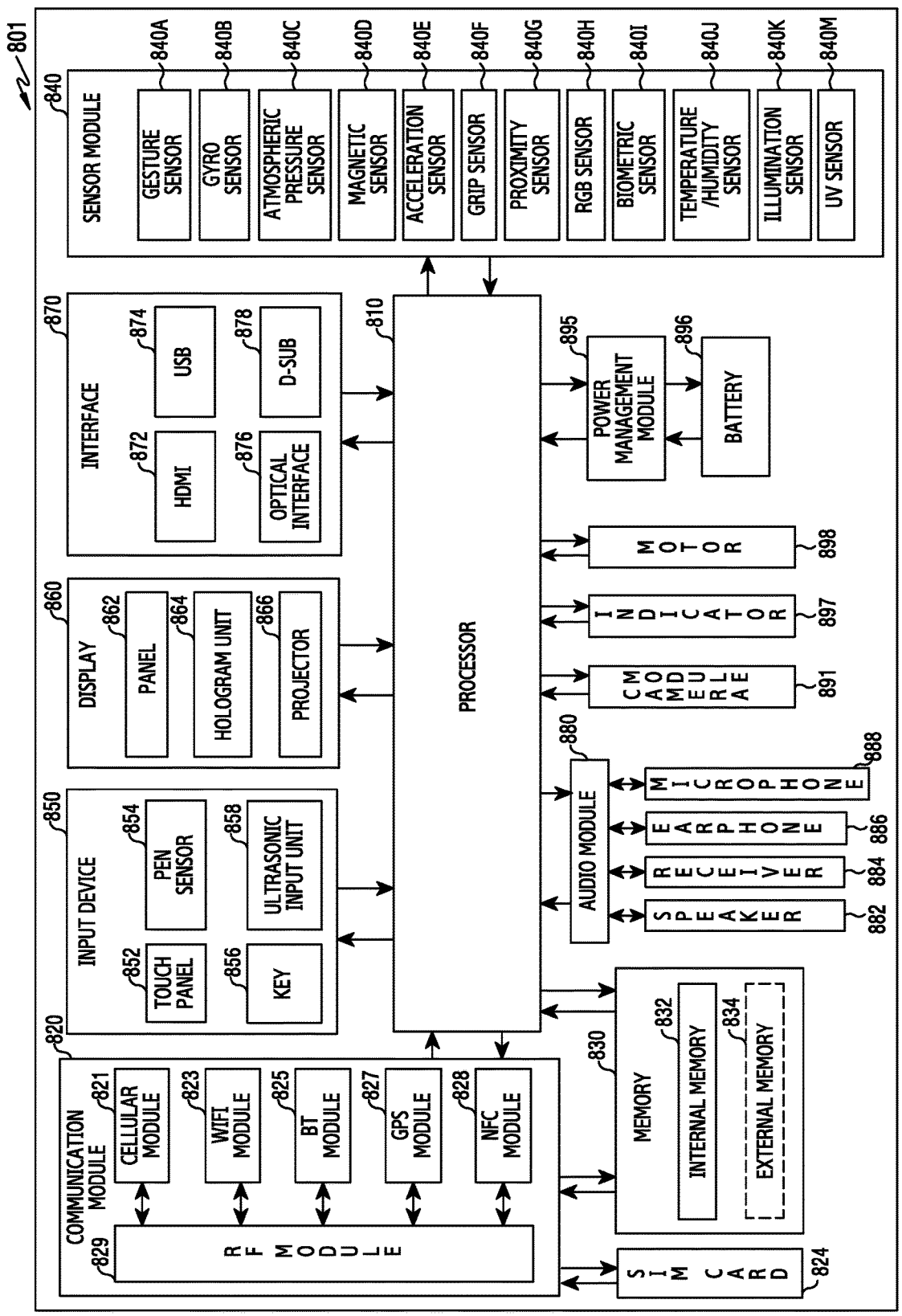
FIG. 8 is a block diagram of an electronic device according to an embodiment.

FIG. 8 is a block diagram of an electronic device 801 according to an embodiment.

The electronic device 801, for example, may include all or part of the electronic device 201 of FIG. 2. The electronic device 801 includes one or more processors (e.g., an AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The processor 810 may, for example, control a plurality of hardware or software components connected to the processor 810 by driving an OS or an application program, and process various pieces of data and calculations. The processor 810 may be embodied as, for example, a system on chip (SoC). According to an embodiment, the processor 810 may further include a graphics processing unit (GPU) and/or an image signal processor. The processor 810 may include at least some (e.g., a cellular module 821) of the components illustrated in FIG. 7. The processor 810 may load, into a volatile memory, commands or data received from at least one (e.g., a non-volatile memory) of the other components, process the loaded commands or data, and store various data in a non-volatile memory.

The communication module 820 may have a configuration equal or similar to that of the communication interface 270. The communication module 820 may include, for example, a cellular module 821, a WiFi module 823, a Bluetooth (BT) module 825, a BT low energy (BLE) module, a GPS module 827, an NFC module 828, and an RF module 829. The cellular module 821, for example, may provide a voice call, a video call, a text message service, or an Internet service through a communication network. According to an embodiment, the cellular module 821 may distinguish and authenticate the electronic device 801 in a communication network using the SIM (e.g., a SIM card) 824. The cellular module 821 may perform at least some of the functions that the processor 810 may provide. The cellular module 821 may include a CP. At least some (e.g., two or more) of the cellular module 821, the WiFi module 823, the BT module 825, the BLE module, the GPS module 827, and the NFC module 828 may be included in one integrated circuit (IC) or IC package. The RF module 829, for example, may transmit/receive a communication signal (e.g., an RF signal). The RF module 829 may include, for example, a transceiver, a power amplifier module (PAM), a frequency filter, a low noise amplifier (LNA), and an antenna. At least one of the cellular module 821, the WiFi module 823, the BT module 825, the BLE module, the GPS module 827, or the NFC module 828 may transmit/receive an RF signal through a separate RF module. The SIM card 824 may include, for example, an embedded SIM, and may contain unique identification information (e.g., an integrated circuit card identifier (ICCID)) or subscriber information (e.g., an international mobile subscriber identity (IMSI)).

The memory 830 may include, for example, an internal memory 832 or an external memory 834. The internal memory 832 may include, for example, at least one of a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard disc drive, a solid state drive (SSD), and the like). The external memory 834 may further include a flash drive, for example, a compact flash (CF), a secure digital (SD) memory card, a micro secure digital (micro-SD) memory card, a mini secure digital (mini-SD) memory card, an extreme digital (xD) memory card, a multimedia card (MMC), a memory stick, and the like. The external memory 834 may be functionally and/or physically connected to the electronic device 801 through various interfaces.

The sensor module 840, for example, may measure a physical quantity or detect an operational state of the electronic device 801, and may convert the measured or detected information into an electrical signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., a red, green, and blue (RGB) sensor), a biometric sensor 840I, a temperature/humidity sensor 840J, an illumination sensor 840K, an ultra violet (UV) light sensor 840M, a pressure sensor, and a geomagnetic sensor. Additionally or alternatively, the sensor module 840 may include, for example, an electronic nose (E-nose) sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 840 may further include a control circuit for controlling one or more sensors included therein. The electronic device 801 may further include a processor configured to control the sensor module 840, as a part of the processor 810 or separately from the processor 810, and may control the sensor module 840 while the processor 810 is in a reduced power of sleeping mode. The electronic device 801 may detect a user wearing an HMD, using the gyro sensor 840B, the acceleration sensor 840E, the geomagnetic sensor, the proximity sensor 840B, or the grip sensor 840F.

The input device 850 may include, for example, a touch panel 852, a (digital) pen sensor 854, a key 856, or an ultrasonic input device 858. The touch panel 852 may use, for example, at least one of a capacitive type panel, a resistive type panel, an infrared type panel, or an ultrasonic type panel. The touch panel 852 may further include a control circuit. The touch panel 852 may further include a tactile layer, and provide a tactile reaction to a user. The (digital) pen sensor 854 may include, for example, a recognition sheet which is a part of the touch panel 852 or is separated from the touch panel 852. The key 856 may include, for example, a physical button, an optical key or a keypad. The ultrasonic input device 858 may detect, through a microphone 888, ultrasonic waves generated by an input tool and identify data corresponding to the detected ultrasonic waves.

The display 860 may include a panel 862, a hologram unit 864, a projector 866, and/or a control circuit for controlling the same. The panel 862 may be implemented to be, for example, flexible, transparent, or wearable. The panel 862 may be implemented as one or more modules with the touch panel 852. The panel 862 may include an LCD, an OLED, an electronic ink display, or an electro-wetting display (EWD). The display 860 may allow the light to pass (e.g., a display having light transmittance). For example, the display 860 having light transmittance may be implemented by mounting a plurality of transparent or translucent regions which transmit light with pixels. Alternatively, the display 860 having light transmittance may be implemented by mounting a plurality of through holes for transmitting light with pixels. The hologram device 864 may show a three dimensional (3D) image in the air by using an interference of light. The projector 866 may project light onto a screen to display an image. The screen may be located, for example, in the interior of or on the exterior of the electronic device 801. The interface 870 may include, for example, and without limitation, an HDMI 872, a USB 874, an optical interface 876, or a D-subminiature (D-sub) connector 878. The interface 870 may be included in, for example, the communication interface 270 of FIG. 2. Additionally or alternatively, the interface 870 may include, for example, a mobile high-definition link (MHL) interface, an SD memory card/MMC interface, or an Infrared Data Association (IrDA) standard interface.

The audio module 880, for example, may bilaterally convert a sound and an electrical signal. At least some components of the audio module 880 may be included in, for example, the input/output interface 245 of FIG. 2. The audio module 880 may process voice information input or output through, for example, a speaker 882, a receiver 884, earphones 886, or the microphone 888. The camera module 891 is, for example, a device which may photograph a still image and record a video. According to an embodiment, the camera module 891 may include one or more image sensors (e.g., a front sensor or a back sensor), a lens, an image signal processor (ISP), or a flash (e.g., an LED or a xenon lamp). The power management module 895 may manage, for example, the power of the electronic device 801. The power management module 895 may include a PMIC, a charger IC, or a battery gauge. The PMIC may use a wired and/or wireless charging method. Examples of a wireless charging method may include, for example, a magnetic resonance method, a magnetic induction method, an electromagnetic wave method, and the like. Additional circuits such as a coil loop, a resonance circuit, or a rectifier for wireless charging may be further included. The battery gauge may measure, for example, a power level, a voltage, a current, or a temperature of the battery 896 while charging. The battery 896 may include, for example, a rechargeable battery and/or a solar battery.

The indicator 897 may display a particular state, for example, a booting state, a message state, a charging state, and the like of the electronic device 801 or a part (e.g., the processor 810) of the electronic device 801. The motor 898 may convert an electrical signal into a mechanical vibration, and may generate a vibration, a haptic effect, and the like. The electronic device 801 may include a mobile TV supporting device (e.g., a GPU) for processing, for example, media data according to digital multimedia broadcasting (DMB), digital video broadcasting (DVB), or MediaFlo™.

Each of the above-described component elements of hardware according to the present disclosure may be configured with one or more components, and the names of the corresponding component elements may vary based on the type of electronic device. In an embodiment, the electronic device (e.g., the electronic device 201) may include some of the elements or further include some other elements. In addition, some of the components may be combined into one entity, which may perform functions identical to those of the relevant components before the combination.

Figure 9:
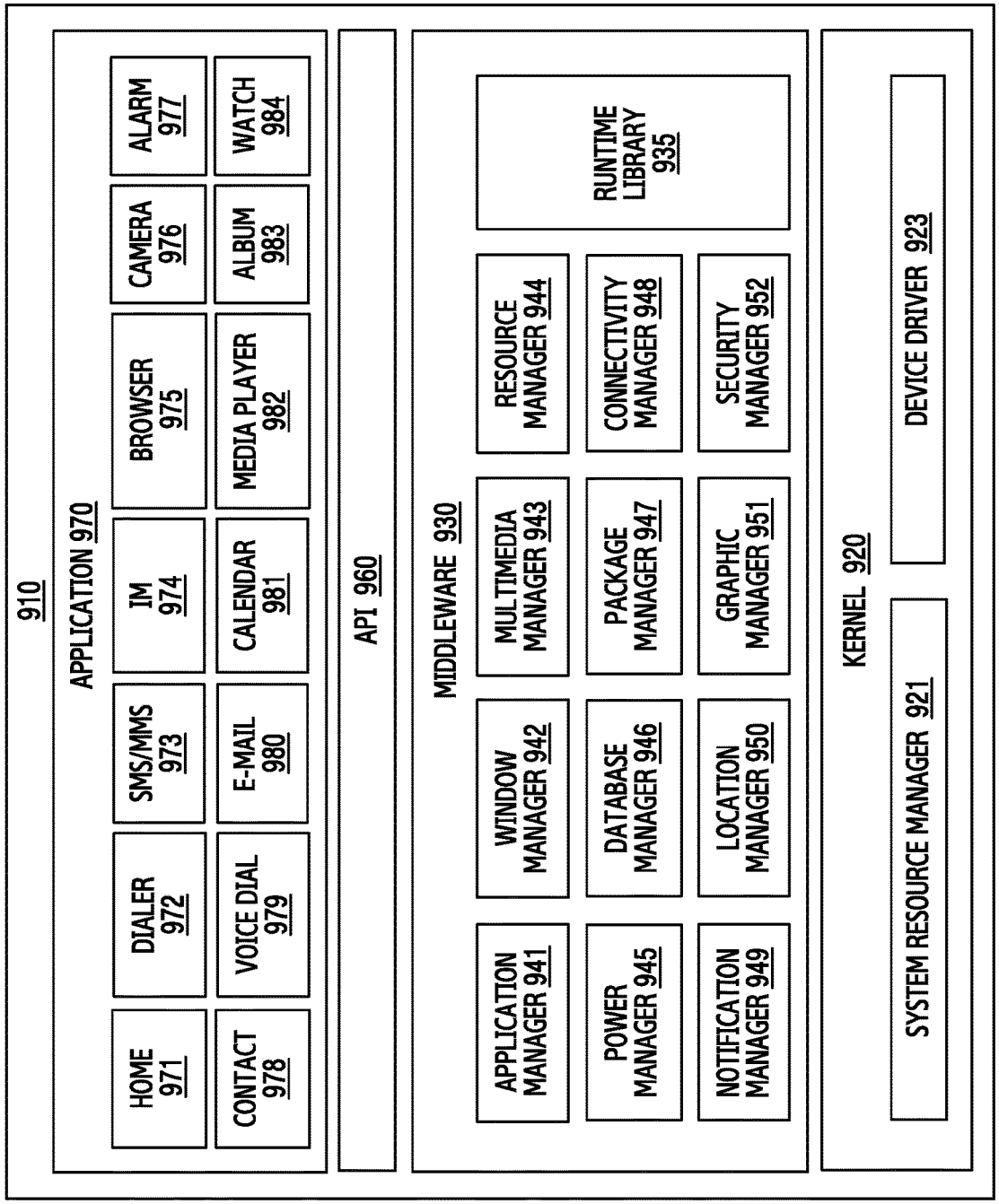
FIG. 9 is a block diagram of a program module according to an embodiment.

FIG. 9 is a block diagram of a program module, according to an embodiment. The program module 910 may include an OS for controlling resources that are related to the electronic device 201 and/or various applications 247 that are operated under the OS. For example, the OS may be Android®, iOS®, Windows®, Symbian®, Tizen®, Bada™, or the like.

The program module 910 may include a kernel 920, middleware 930, an API 960, and/or an application 970. At least some of the program module 910 may be preloaded in the electronic device, or may be downloaded from external electronic devices 202 and 204, or the server 206.

The kernel 920, for example, may include a system resource manager 921 and/or a device driver 923. The system resource manager 921 may perform control, allocation, or collection of system resources. According to an embodiment, the system resource manager 921 may include a process management unit, a memory management unit, or a file system management unit. The device driver 923, for example, may include a display driver, a camera driver, a Bluetooth driver, a shared memory driver, a USB driver, a keypad driver, a WiFi® driver, an audio driver, or an inter-process communication (IPC) driver.

In an embodiment, the display driver may control one or more display driver ICs (DDIs). The display driver may include functions for controlling a screen according to requests of the application 970.

The middleware 930, for example, may provide functions required in common for the application 970, or may provide various functions to the application 970 through the API 960 in order to allow the application 970 to effectively use limited system resources in the electronic device. According to an embodiment, the middleware 930 may include at least one of a run time library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The run time library 935, for example, may include a library module that a compiler uses in order to add new functions through programming languages while the application 970 are executed. The run time library 935 may perform the input/output management, the memory management, or a function of an arithmetic calculation.

The application manager 941, for example, may manage a life cycle of at least one of the application 970. The window manager 942 may manage a graphical user interface (GUI) resource that is used in the screen. For example, in a case where two or more displays 860 are connected, the screen may be differently configured or managed according to a screen ratio or the operation of the application 970. The multimedia manager 943 may identify formats for reproducing various media files, and may perform encoding or decoding of media files by using a codec that conforms to the corresponding format. The resource manager 944 may manage resources, such as source code, memories, or storage spaces of one or more application 970.

The power manager 945, for example, may manage a battery or power by operating in association with a basic input/output system (BIOS), and may provide power information that is necessary for the operation of the electronic device. The database manager 946 may create, retrieve, or change a database that is to be used in one or more application 970. The package manager 947 may manage the installation or updating of the applications that are distributed in the form of a package file.

The connectivity manager 948, for example, may manage a wireless connection, such as WiFi or Bluetooth. The notification manager 949 may display or notify of events (such as received messages, appointments, or proximity notifications) to a user without disturbance. The location manager 950 may manage location information of the electronic device. The graphic manager 951 may manage graphic effects to be provided to a user or user interfaces related thereto. The security manager 952 may provide a general security function that is required for the system security or user verification. According to an embodiment, in a case of the electronic device (for example, the electronic device 201) adopting a phone call function, the middleware 930 may further include a telephony manager for managing the functions of a voice call or a video call of the electronic device.

The middleware 930 may include a middleware module that forms a combination of various functions of the above-described elements. The middleware 930 may provide a module that is specialized according to a type of OS in order to provide differentiated functions. In addition, the middleware 930 may dynamically exclude some of the typical elements or add new elements.

The API 960, for example, may be a group of API programming functions, and may be provided as a different configuration according to an OS. For example, one set of APIs may be provided to each platform in the case of Android® or iOS®, and two or more sets of APIs may be provided to each platform in the case of Tizen®.

The application 970, for example, may include one or more applications that may execute functions of a home application 971, a dialer application 972, a short message service/multimedia messaging service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a watch application 984, a healthcare application (for example, measuring an amount of exercise or a blood glucose level), providing environment information (for example, providing atmospheric pressure, humidity, or temperature information), or the like.

According to an example embodiment, the application 970 may include an information-exchange application that supports an exchange of information between the electronic device 201 and an external electronic device 202 or 204. The information-exchange application, for example, may include a notification relay application for relaying certain information to the external electronic devices, or may include a device management application for managing the external electronic devices.

For example, the notification relay application may include a function of transferring notification information that is generated in other applications (for example, the SMS/MMS application 973, the e-mail application 980, the healthcare application, or the environment information application) of the electronic device to the external electronic device. In addition, the notification relay application, for example, may receive notification information from the external electronic device to then provide the same to the user.

The device management application, for example, may manage (for example, install, delete, or update) one or more functions {for example, turning on and off the external electronic device (or some equipped sensors) or adjusting the brightness (or resolution) of a display} of the external electronic device that communicates with the electronic device; applications that are executed in the external electronic device; or services (for example, a phone call service or a messaging service) that are provided by the external electronic device.

According to an example embodiment, the application 970 may include applications (for example, the healthcare application of a mobile medical device) that are designated according to the attribute of the external electronic device. The application 970 may include applications that are received from the external electronic device. The application 970 may include preloaded applications or third party applications that may be downloaded from a server. The names of the elements of the program module 910, according to the illustrated embodiment, may vary depending on a type of OS.

According to an embodiment, at least some of the program module 910 may be implemented by software, firmware, hardware, or a combination thereof. At least some of the program module 910, for example, may be implemented (for example, executed) by the processor 220. At least some of the program module 910, for example, may include modules, program routines, sets of instructions, or processors for executing one or more functions.

According to an embodiment, an electronic device may include a power management circuit for supplying power to the electronic device; a first battery electrically connected with a power input port of the power management circuit; a second battery electrically connected with the power input port; a first charging circuit for charging the first battery; a second charging circuit for charging the second battery; a first current control circuit electrically connected between the first charging circuit and the first battery, and configured to control a first charging current supplied from the first charging circuit to the first battery and a leakage current due to a voltage difference between the first battery and the second battery; and a second current control circuit electrically connected between the second charging circuit and the second battery, and configured to control a second charging current supplied from the second charging circuit to the second battery and the leakage current.

According to an embodiment, the first battery and the second battery may have different characteristics.

According to an embodiment, the first charging circuit may be connected to the second charging circuit.

According to an embodiment, if a first current greater than an allowable current of the first battery flows in the first battery, the first current control circuit may decrease the first current to below the allowable current, and if a second current greater than an allowable current of the second battery flows in the second battery, the second current control circuit may decrease the second current to below the allowable current.

According to an embodiment, the electronic device may further include a third current control circuit electrically connected between the first charging circuit and the first battery, and configured to control a first discharging current supplied from the first battery to the power management circuit and a leakage current due to a voltage difference between the first battery and the second battery; and a fourth current control circuit electrically connected between the second charging circuit and the second battery, and configured to control a second discharging current supplied from the second battery to the power management circuit and the leakage current.

According to an embodiment, an output port of the first current control circuit and an output port of the third current control circuit may be connected, and an output port of the second current control circuit and an output port of the fourth current control circuit may be connected.

According to an embodiment, the electronic device may further include a processor connected with the third current control circuit and the fourth current control circuit, wherein the processor may be configured to identify setting currents of the third current control circuit and the fourth current control circuit, determine whether battery state information satisfies an update condition, and if the battery state information satisfies the update condition, change the setting current of the third current control circuit or the fourth current control circuit.

According to an embodiment, the battery state information may include at least one of power levels of the first battery and the second battery, temperatures of the first battery and the second battery, or a current flowing in the first battery and the second battery.

According to an embodiment, the update condition may include at least one of a case where a power level difference of the first battery and the second battery exceeds a threshold, or a case where at least one temperature of the first battery and the second battery exceeds a reference temperature.

According to an embodiment, the electronic device may further include a first power supply control circuit electrically connected between the first charging circuit and the power management circuit, and configured to control a leakage current due to a voltage difference between the first battery and the second battery; and a second power supply control circuit electrically connected between the second charging circuit and the power management circuit and configured to control the leakage current.

According to an embodiment, an electronic device may include a power management circuit for supplying power to the electronic device; a first battery electrically connected with a power input port of the power management circuit; a second battery electrically connected with the power input port; a first charging circuit for charging the first battery; a second charging circuit for charging the second battery; a first power supply control circuit electrically connected between the first charging circuit and the power management circuit, and configured to control a leakage current due to a voltage difference between the first battery and the second battery; and a second power supply control circuit electrically connected between the second charging circuit and the power management circuit and configured to control the leakage current.

According to an embodiment, the first battery and the second battery may have different characteristics.

According to an embodiment, the first charging circuit may be connected to the second charging circuit.

According to an embodiment, the electronic device may further include a first current control circuit electrically connected between the first charging circuit and the first battery, and configured to control a first charging current supplied from the first charging circuit to the first battery and a leakage current due to a voltage difference between the first battery and the second battery; and a second current control circuit electrically connected between the second charging circuit and the second battery, and configured to control a second charging current supplied from the second charging circuit to the second battery and the leakage current.

According to an embodiment, the electronic device may further include a third current control circuit electrically connected between the first charging circuit and the first battery, and configured to control a first discharging current supplied from the first battery to the power management circuit and a leakage current due to a voltage difference between the first battery and the second battery; and a fourth current control circuit electrically connected between the second charging circuit and the second battery, and configured to control a second discharging current supplied from the second battery to the power management circuit and the leakage current.

According to an embodiment, an output port of the first current control circuit and an output port of the third current control circuit may be connected, and an output port of the second current control circuit and an output port of the fourth current control circuit may be connected.

According to an embodiment, the electronic device may further include a processor connected with the first charging circuit, the second charging circuit, the first power supply control circuit, and the second power supply control circuit, wherein the processor is configured to detect a connection of the electronic device to an external charging device, compare a power level of the first battery with a power level of the second battery, if the power level of the first battery is greater than the power level of the second battery, turn off the second power supply control circuit, and if the power level of the first battery is less than the power level of the second battery, turn off the first power supply control circuit.

According to an embodiment, the processor may be configured to determine whether to supply power to the electronic device if the first power supply control circuit is turned on, and to discharge the first battery if the electronic device requires the power supply.

According to an embodiment, the processor may be configured to determine whether to supply power to the electronic device if the second power supply control circuit is turned on, and to discharge the second battery if the electronic device requires power.

According to an embodiment, the processor may be configured to discharge the first battery and charge the second battery if the second power supply control circuit is turned off and the electronic device requires power, and to charge the first battery and discharge the second battery if the first power supply control circuit is turned off and the electronic device requires power.

Figure 10:
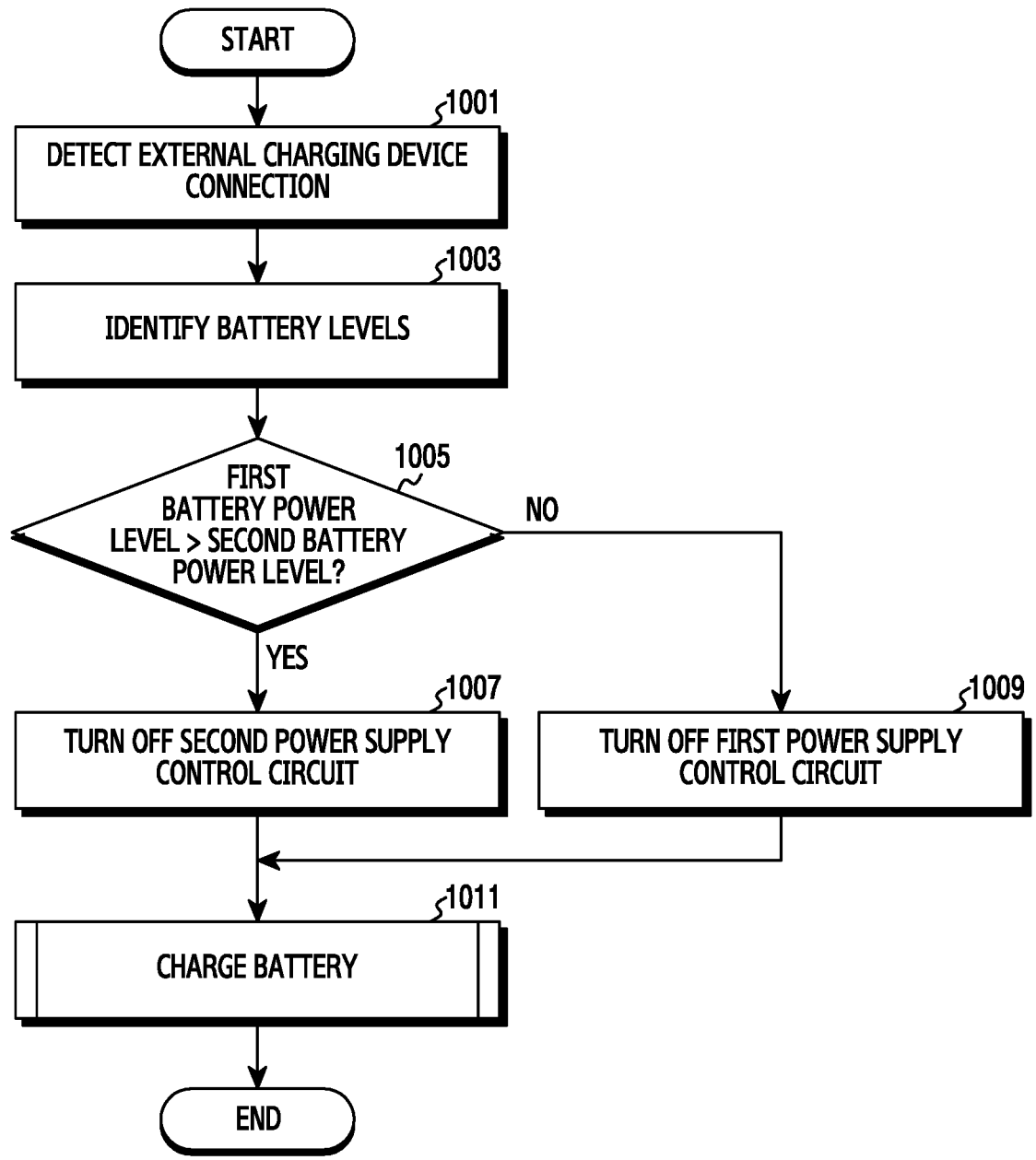
FIG. 10 is a flowchart of a method for charging batteries of an electronic device according to an embodiment.

FIG. 10 is a flowchart of a method for charging batteries of an electronic device according to an embodiment. The electronic device may include the electronic device 201 of FIG. 2 or at least part (e.g., the processor 220) of the electronic device 201.

Referring to FIG. 10, the electronic device 201 may detect a connection of an external charging device through the first charging circuit 320 or the second charging circuit 330 in step 1001. For example, the processor 220, which detects the connection of the external charging device, may detect a charging current flowing through an input port of the first charging circuit 320.

In step 1003, the electronic device 201 may identify battery power levels through the first charging circuit 320 and the second charging circuit 330. For example, the processor 220 may identify the power level of the first battery 301 based on information received from the first charging circuit 320, and identify the power level of the second battery 302 based on information received from the second charging circuit 330.

In step 1005, the electronic device 201 may compare the power levels of the first battery 301 and the second battery 302. For example, the processor 220 may determine which battery has a greater power level by comparing the power levels of the first battery 301 and the second battery 302.

If the power level of the first battery 301 is greater than the power level of the second battery 302, the electronic device 201 may turn off the second power supply control circuit 350 in step 1007 and turn on or keep turned on the first power supply control circuit 340. For example, to disconnect the second battery 302 of the lesser power level from the system 310, the processor 220 may turn off the second power supply control circuit 350.

In step 1011, the electronic device 201 may charge the battery. For example, the processor 220 may control the second charging circuit 330 to charge the second battery 302 and control the first charging circuit 320 to charge the first battery 301. If the system 310 requires power, the processor 220 may supply power to the system 310 using only the first battery 301.

In contrast, if the power level of the first battery 301 is less than the power level of the second battery 302, the electronic device 201 may turn off the first power supply control circuit 340 in step 1009 and turn on or keep turned on the second power supply control circuit 350. For example, to disconnect the first battery 302 of the lesser power level from the system 310, the processor 220 may turn off the first power supply control circuit 340.

In step 1011, the electronic device 201 may charge the battery. For example, the processor 220 may control the second charging circuit 330 to charge the second battery 302 and control the first charging circuit 320 to charge the first battery 301. If the system 310 requires power, the processor 220 may supply the power to the system 310 using only the second battery 302.

Figure 11:
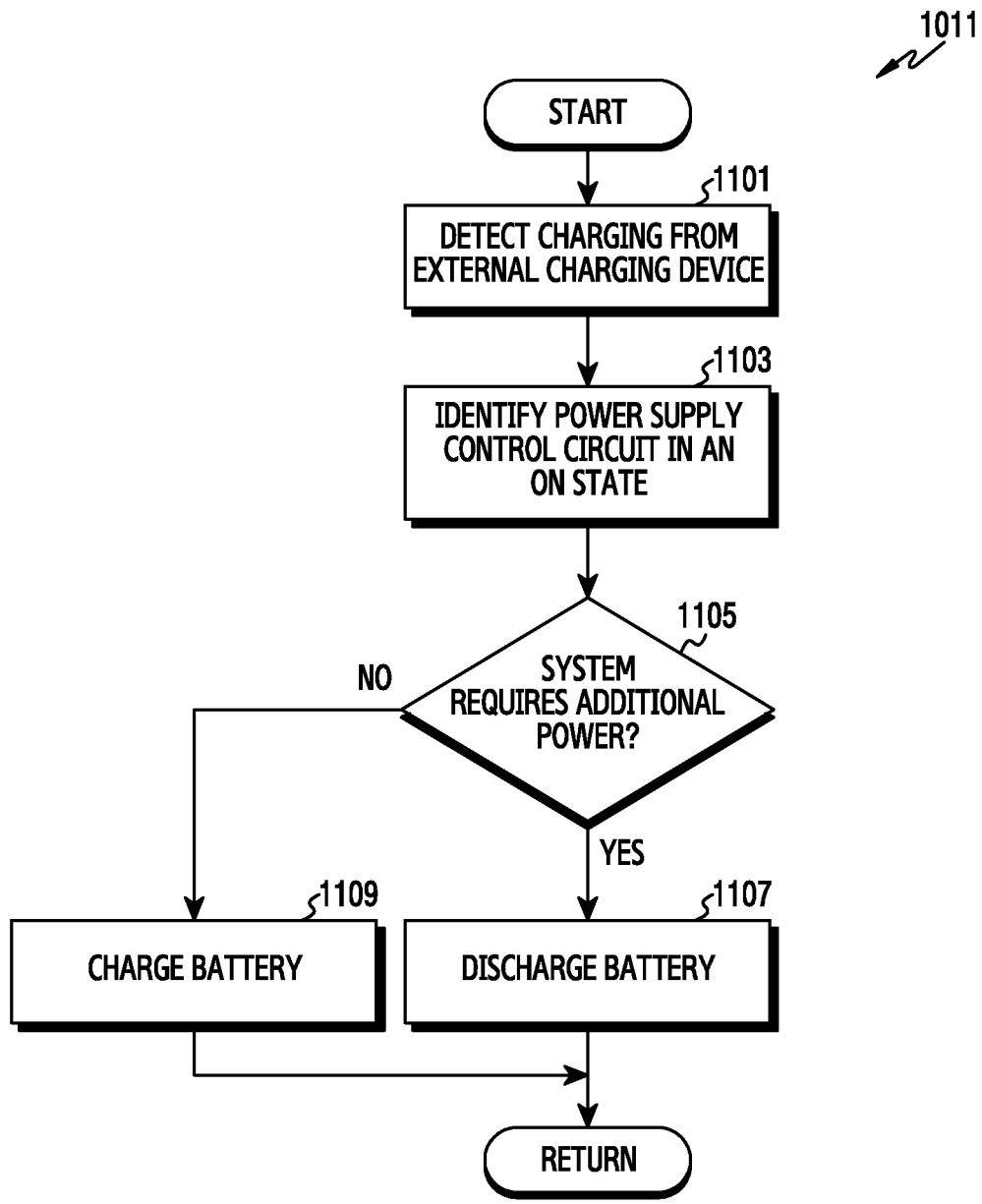
FIG. 11 is a flowchart of a method for charging or discharging batteries of an electronic device according to an embodiment.

FIG. 11 is a flowchart of a method for charging and discharging batteries of an electronic device according to an embodiment. For example, charging the battery in step 1011 of FIG. 10 is described below.

Referring to FIG. 11, in step 1101, the electronic device 201 may detect charging from an external charging device. For example, the processor 220 may detect a charging current after a connection to the external charging device is detected.

In step 1103, the electronic device 201 may identify the power supply control circuit in an ON state. For example, the processor 220 may identify whether the power supply control circuit operating in the ON state is the first power supply control circuit 340 or the second power supply control circuit 350 by comparing the power levels of the first battery 301 and the second battery 302.

In step 1105, the electronic device 201 may identify whether the system 310 requires additional power. For example, if the external charging device may not supply all the power required by the system 310, the processor 220 may identify that the system 310 requires additional power.

If the system 310 requires additional power, the electronic device 201 may discharge the battery in step 1107. For example, if the first power supply control circuit 340 is turned on, the processor 220 may supply additional power from the first battery 301 to the system 310 by discharging the first battery 301 and continuing to charge the second battery 302. In contrast, if the second power supply control circuit 350 is turned on, the processor 220 may supply additional power from the second battery 302 to the system 310 by discharging the second battery 302 and continuing to charge the first battery 301. Next, the electronic device 201 may return to the operations of FIG. 10.

If there is no need to supply additional power to the system 310, the electronic device 201 may charge the battery in step 1109. For example, the processor 220 may charge the first battery 301 and the second battery 302 regardless of the ON/OFF state of the power supply control circuit. Next, the electronic device 201 may return to the operations of FIG. 10.

Figure 12:
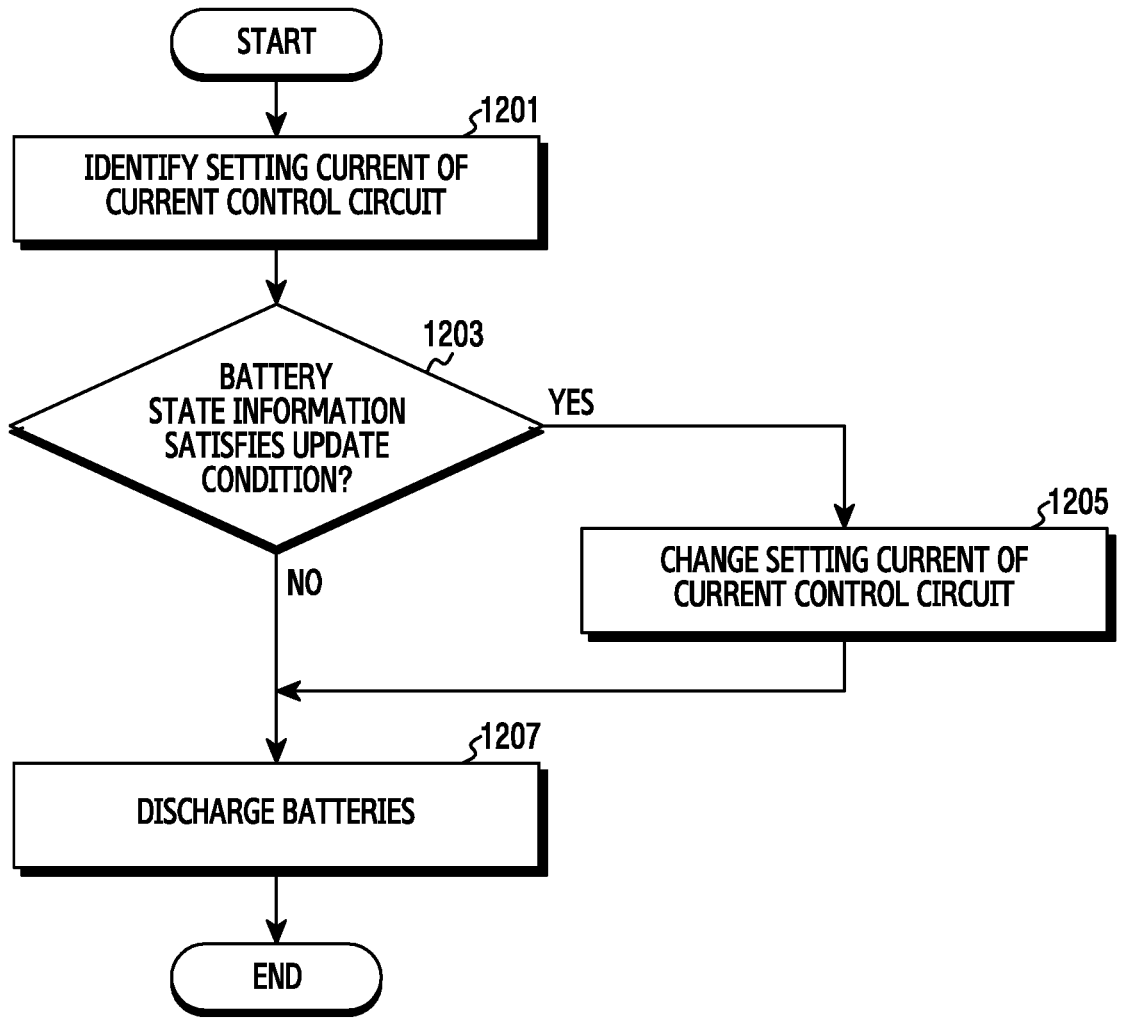
FIG. 12 is a flowchart of a method for discharging batteries of an electronic device according to an embodiment.

FIG. 12 is a flowchart of a method for discharging batteries of an electronic device according to an embodiment.

Referring to FIG. 12, the electronic device 201 may identify the setting current of the current control circuit in step 1201. For example, the processor 220 may identify the setting current of the third current control circuit 380 or the fourth current control circuit 390.

In step 1203, the electronic device 201 may determine whether battery state information satisfies an update condition. For example, the battery state information may include a battery power level, a battery temperature, a current of the battery, and so on. The update condition may include a case where a battery power level difference exceeds a threshold, or a case where the battery temperature exceeds a reference temperature. For example, the processor 220 may determine whether the state information of the first battery 301 and the second battery 302 satisfy the update condition through the first charging circuit 320 and the second charging circuit 330, respectively.

If the battery state information satisfies the update condition, the electronic device 201 may change the setting current of the current control circuit in step 1205. For example, the processor 220 may compare the power levels of the first battery 301 and the second battery 302, and if the power level of the first battery 301 is greater than the power level of the second battery 302 by more than the threshold, increase the setting current of the third current control circuit 380 and decrease the setting current of the fourth current control circuit 390. Hence, the first battery 301 may supply more discharging current to the system 310, and the second battery 302 may supply less discharging current to the system 310. Herein, the threshold may be a value more than half of the full battery capacity. For example, the processor 220 may identify the temperatures of the first battery 301 and the second battery 302 through the first charging circuit 320 and the second charging circuit 330. If the temperature of the first battery 301 is greater than the reference temperature, the processor 220 may lower the setting current of the third current control circuit 380 and increase the setting current of the fourth current control circuit 390. Herein, the reference temperature may be the allowable temperature of the battery. Thus, the discharging current of the first battery 301 may be limited or reduced, and the discharging current of the second battery 302 may be increased.

In contrast, if the battery state information does not satisfy the update condition, the electronic device 201 may discharge the batteries in step 1207. For example, if the currents flowing through the first battery 301 and the second battery 302 fall below the setting current, the processor 220 may continuously supply the power of the first battery 301 and the second battery 302 to the system 310.

The method and the electronic device according to an embodiment may, if some of the batteries are discharged during charging, prevent a discharging current of a battery from leaking to the charging battery and thus improve the lifetime and the safety of the battery.

In addition, the method and the electronic device according to an embodiment may, if the batteries are discharging, control the discharging current of the batteries to not exceed an allowable battery current and thus improve the lifetime and the safety of the battery.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. An electronic device, comprising:
a power management circuit configured to supply power to the electronic device;
a first battery electrically connected with a power input port of the power management circuit;
a second battery electrically connected with the power input port;
a first charging circuit configured to charge the first battery;
a second charging circuit configured to charge the second battery;
a first current control circuit electrically connected between the first charging circuit and the first battery, and configured to control a first charging current supplied from the first charging circuit to the first battery and a leakage current due to a voltage difference between the first battery and the second battery;
a second current control circuit electrically connected between the second charging circuit and the second battery, and configured to control a second charging current supplied from the second charging circuit to the second battery and the leakage current; and
a third current control circuit electrically connected between the first charging circuit and the first battery, and configured to control a discharging current supplied from the first battery to the power management circuit and the leakage current due to the voltage difference between the first battery and the second battery.

2. The electronic device of claim 1, wherein the first battery and the second battery have different characteristics.

3. The electronic device of claim 1, wherein the first charging circuit is connected to the second charging circuit.

4. The electronic device of claim 1, wherein, if a first current greater than an allowable current of the first battery flows in the first battery, the first current control circuit is further configured to decrease the first current to below the allowable current of the first battery, and
if a second current greater than an allowable current of the second battery flows in the second battery, the second current control circuit is configured to decrease the second current to below the allowable current of the second battery.

5. The electronic device of claim 1, further comprising:
a fourth current control circuit electrically connected between the second charging circuit and the second battery, and configured to control a second discharging current supplied from the second battery to the power management circuit and the leakage current.

6. The electronic device of claim 5, further comprising an output port of the first current control circuit connected to an output port of the third current control circuit, and an output port of the second current control circuit connected to an output port of the fourth current control circuit.

7. The electronic device of claim 5, further comprising:
a processor connected with the third current control circuit and the fourth current control circuit,
wherein the processor is configured to:
identify setting currents of the third current control circuit and the fourth current control circuit,
determine whether battery state information satisfies an update condition, and
if the battery state information satisfies the update condition, change the setting current of the third current control circuit or the fourth current control circuit.

8. The electronic device of claim 7, wherein the battery state information comprises at least one of power levels of the first battery and the second battery, temperatures of the first battery and the second battery, or a current flowing in the first battery and the second battery.

9. The electronic device of claim 7, wherein the update condition comprises at least one of a power level difference of the first battery and the second battery exceeding a threshold, or at least one temperature of the first battery and the second battery exceeding a reference temperature.

10. The electronic device of claim 1, further comprising:
a first power supply control circuit electrically connected between the first charging circuit and the power management circuit, and configured to control the leakage current due to the voltage difference between the first battery and the second battery; and
a second power supply control circuit electrically connected between the second charging circuit and the power management circuit, and configured to control the leakage current.

11. An electronic device, comprising:
a power management circuit configured to supply power to the electronic device;
a first battery electrically connected with a power input port of the power management circuit;
a second battery electrically connected with the power input port;
a first charging circuit configured to charge the first battery;
a second charging circuit configured to charge the second battery;
a first power supply control circuit electrically connected between the first charging circuit and the power management circuit, and configured to control a leakage current due to a voltage difference between the first battery and the second battery;
a second power supply control circuit electrically connected between the second charging circuit and the power management circuit, and configured to control the leakage current;
a first current control circuit electrically connected between the first charging circuit and the first battery;
a second current control circuit electrically connected between the second charging circuit and the second battery; and
a third current control circuit electrically connected between the first charging circuit and the first battery, and configured to control a first discharging current supplied from the first battery to the power management circuit and the leakage current due to the voltage difference between the first battery and the second battery.

12. The electronic device of claim 11, wherein the first battery and the second battery have different characteristics.

13. The electronic device of claim 11, wherein the first charging circuit is connected to the second charging circuit.

14. The electronic device of claim 11,
wherein the first current control circuit is configured to control a first charging current supplied from the first charging circuit to the first battery and the leakage current due to the voltage difference between the first battery and the second battery; and
wherein the second current control circuit is configured to control a second charging current supplied from the second charging circuit to the second battery and the leakage current.

15. The electronic device of claim 11, further comprising:
a fourth current control circuit electrically connected between the second charging circuit and the second battery, and configured to control a second discharging current supplied from the second battery to the power management circuit and the leakage current.

16. The electronic device of claim 11, further comprising:
a processor connected with the first charging circuit, the second charging circuit, the first power supply control circuit, and the second power supply control circuit,
wherein the processor is configured to:
detect a connection of the electronic device to an external charging device,
compare a power level of the first battery with a power level of the second battery,
if the power level of the first battery is greater than the power level of the second battery, turn off the second power supply control circuit, and
if the power level of the first battery is less than the power level of the second battery, turn off the first power supply control circuit.

17. The electronic device of claim 16, wherein the processor is further configured to:
determine whether to supply power to the electronic device if the first power supply control circuit is turned on, and
discharge the first battery if the electronic device requires power.

18. The electronic device of claim 16, wherein the processor is further configured to:

determine whether to supply power to the electronic device if the second power supply control circuit is turned on, and discharge the second battery if the electronic device requires power.

19. The electronic device of claim 16, wherein the processor is further configured to:

discharge the first battery and charge the second battery if the second power supply control circuit is turned off and the electronic device requires power, and charge the first battery and discharge the second battery if the first power supply control circuit is turned off and the electronic device requires power.

* * * * *